United States Patent
Hasegawa et al.

(10) Patent No.: US 12,024,174 B2
(45) Date of Patent: Jul. 2, 2024

(54) CONTROL DEVICE FOR VEHICLE

(71) Applicants: JTEKT CORPORATION, Kariya (JP); TOYOTA JIDOSHA KABUSHIKI KAISHA, Toyota (JP); DENSO CORPORATION, Kariya (JP)

(72) Inventors: Kazuma Hasegawa, Anjo (JP); Yuji Fujita, Okazaki (JP); Takashi Kodera, Okazaki (JP); Isao Namikawa, Okazaki (JP); Atsushi Ishihara, Sakurai (JP); Masaharu Yamashita, Toyota (JP); Kenji Shibata, Nagoya (JP); Yuko Goto, Okazaki (JP); Hiroki Tomizawa, Kariya (JP); Nobuyori Nakajima, Kariya (JP)

(73) Assignees: JTEKT CORPORATION, Kariya (JP); TOYOTA JIDOSHA KABUSHIKI KAISHA, Toyota (JP); DENSO CORPORATION, Kariya (JP)

(*) Notice: Subject to any disclaimer, the term of this patent is extended or adjusted under 35 U.S.C. 154(b) by 0 days.

(21) Appl. No.: 17/972,017

(22) Filed: Oct. 24, 2022

(65) Prior Publication Data
US 2023/0125769 A1 Apr. 27, 2023

(30) Foreign Application Priority Data
Oct. 25, 2021 (JP) .................. 2021-173728

(51) Int. Cl.
*B60W 10/20* (2006.01)
*B60W 30/182* (2020.01)
(Continued)

(52) U.S. Cl.
CPC .......... *B60W 30/182* (2013.01); *B60W 10/20* (2013.01); *B60W 50/0205* (2013.01);
(Continued)

(58) Field of Classification Search
CPC ............... B60W 30/182; B60W 10/20; B60W 50/0205; B60W 50/029; B60W 50/082;
(Continued)

(56) References Cited

U.S. PATENT DOCUMENTS 9,195,232 B1 11/2015 Egnor et al.
2018/0086369 A1* 3/2018 Yanagi .................. B62D 5/003
(Continued)

FOREIGN PATENT DOCUMENTS

JP 6378119 B2 8/2018
JP 2021-035072 A 3/2021

OTHER PUBLICATIONS

Apr. 11, 2023 Extended Search Report issued in European Patent Application No. 22203278.1.

*Primary Examiner* — Tisha D Lewis
(74) *Attorney, Agent, or Firm* — Oliff PLC

(57) ABSTRACT

A control device includes control circuits of a plurality of systems. When a transition condition is established, the control circuits of the systems make transition of a driving mode from a first driving mode to a second driving mode, and when a return condition is established in a state in which the driving mode has transitioned to the second driving mode, the control circuits of the systems make transition of the driving mode from the second driving mode to the first driving mode while gradually changing the current command values of the control circuits' own systems toward the current command values before the adjustment.

8 Claims, 11 Drawing Sheets

(51) Int. Cl.
*B60W 50/02* (2012.01)
*B60W 50/029* (2012.01)
*B60W 50/08* (2020.01)
*B60W 50/00* (2006.01)

(52) U.S. Cl.
CPC ........ *B60W 50/029* (2013.01); *B60W 50/082* (2013.01); *B60W 50/085* (2013.01); *B60W 2050/0022* (2013.01); *B60W 2050/0292* (2013.01); *B60W 2510/083* (2013.01); *B60W 2510/202* (2013.01)

(58) Field of Classification Search
CPC ....... B60W 50/085; B60W 2050/0022; B60W 2050/0292; B60W 2510/083; B60W 2510/202; B62D 5/001; B62D 5/0481; B62D 5/0493; B62D 5/0484
See application file for complete search history.

(56) References Cited

U.S. PATENT DOCUMENTS

| | | |
|---|---|---|
| 2019/0256129 A1 | 8/2019 | Oka et al. |
| 2019/0260324 A1* | 8/2019 | Kuramitsu ........... B62D 5/0484 |
| 2020/0353974 A1* | 11/2020 | Nakamura ........... B62D 15/025 |
| 2020/0353975 A1* | 11/2020 | Nakamura ............ H02P 29/028 |
| 2021/0046974 A1 | 2/2021 | Dotake et al. |
| 2021/0053615 A1 | 2/2021 | Kondo et al. |

* cited by examiner

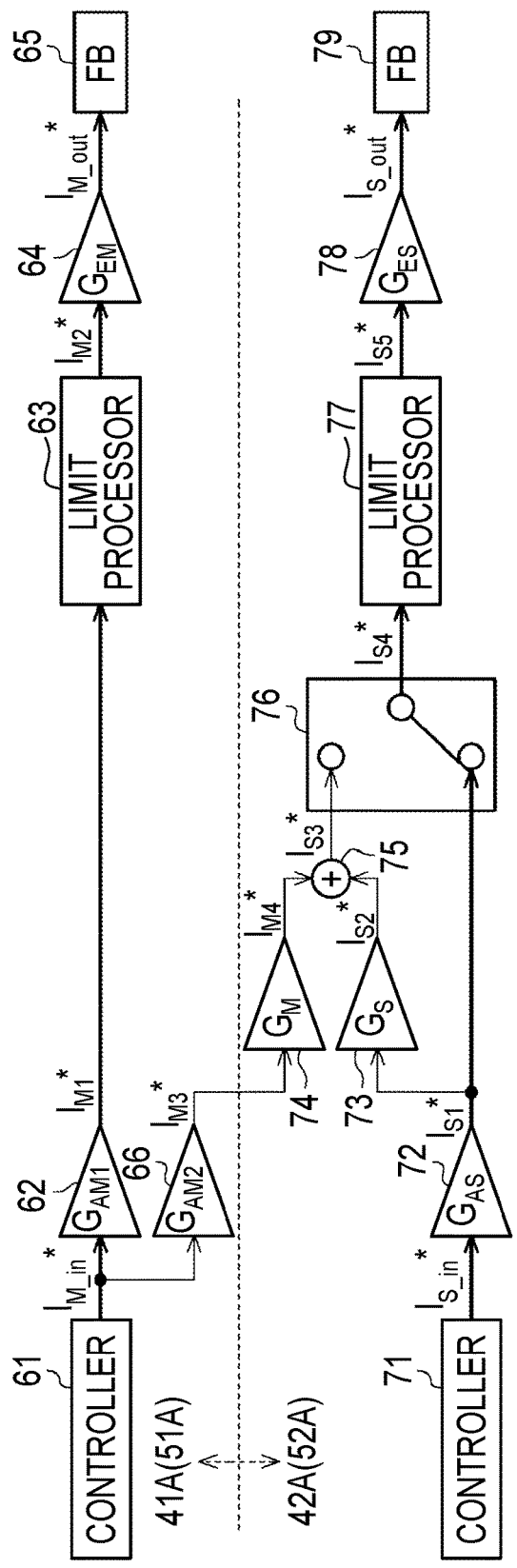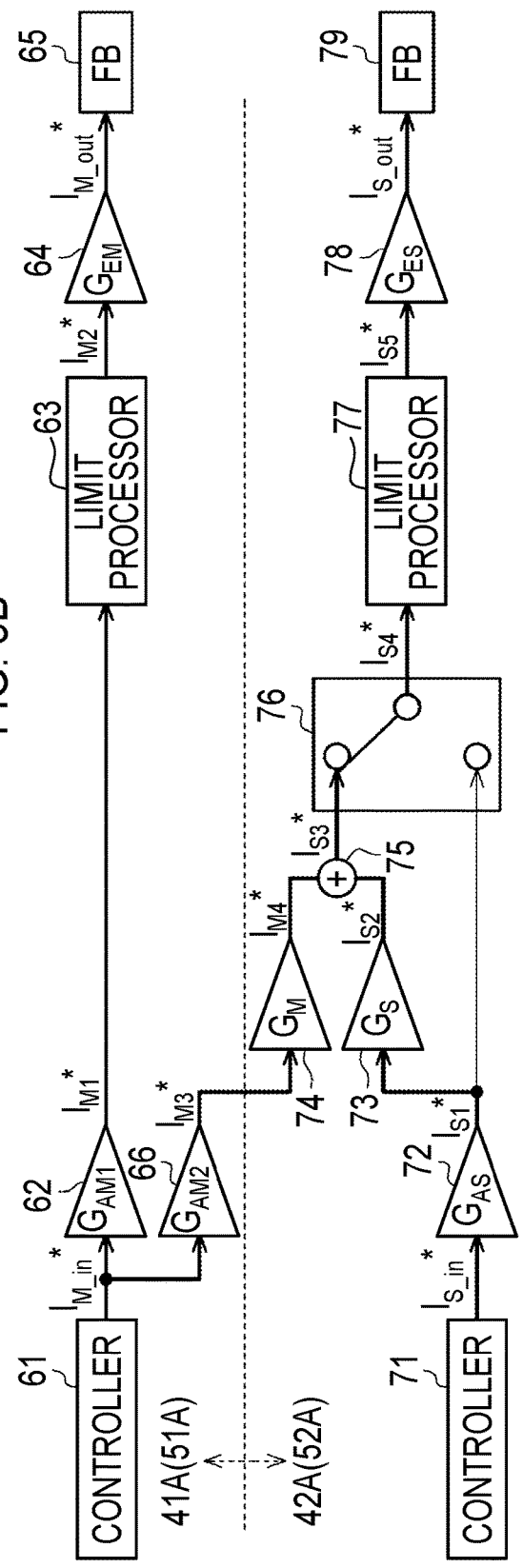

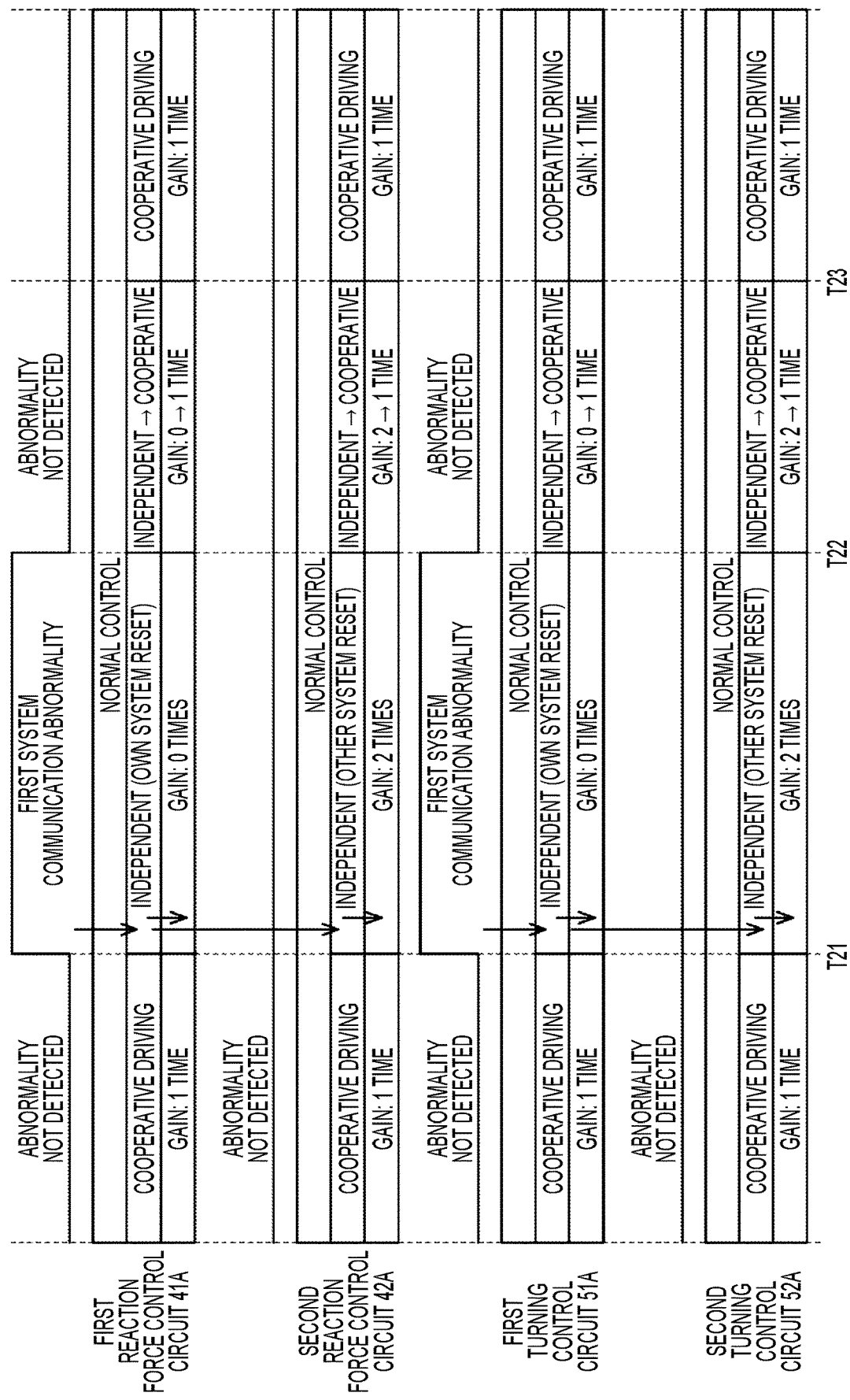

| | INDEPENDENT DRIVING (RETURN) | WHEN RETURN DETERMINATION IS ESTABLISHED | M:S = 1:9 | M:S = 9:1 | RETURN COMPLETED |
|---|---|---|---|---|---|
| $I_{M\_In}$ | 100 | | | | |
| $G_{AM1}$ | 0 | 0 | 0.1 | 0.9 | 1 |
| $G_{AM2}$ | 2 | 2 | 1.9 | 1.1 | 1 |
| LIMIT | 100 | | | | |
| $G_{EM}$ | 0.5 | | | | |
| $I_{IM\_out}$ | 0 | 0 | 5 | 45 | 50 |
| $I_{S\_in}$ | 100 | | | | |
| $G_{AS}$ | 2 | 2 | 1.9 | 1.1 | 1 |
| $G_M$ | 0 | 0 | 0.1 | 0.9 | 1 |
| $G_S$ | 1 | 1 | 0.9 | 0.1 | 0 |
| LIMIT | 100 | | | | |
| $G_{ES}$ | 0.5 | | | | |
| $I_{S\_out}$ | 50 | 50 | 50 | 50 | 50 |
| Total | 50 | 50 | 55 | 95 | 100 |

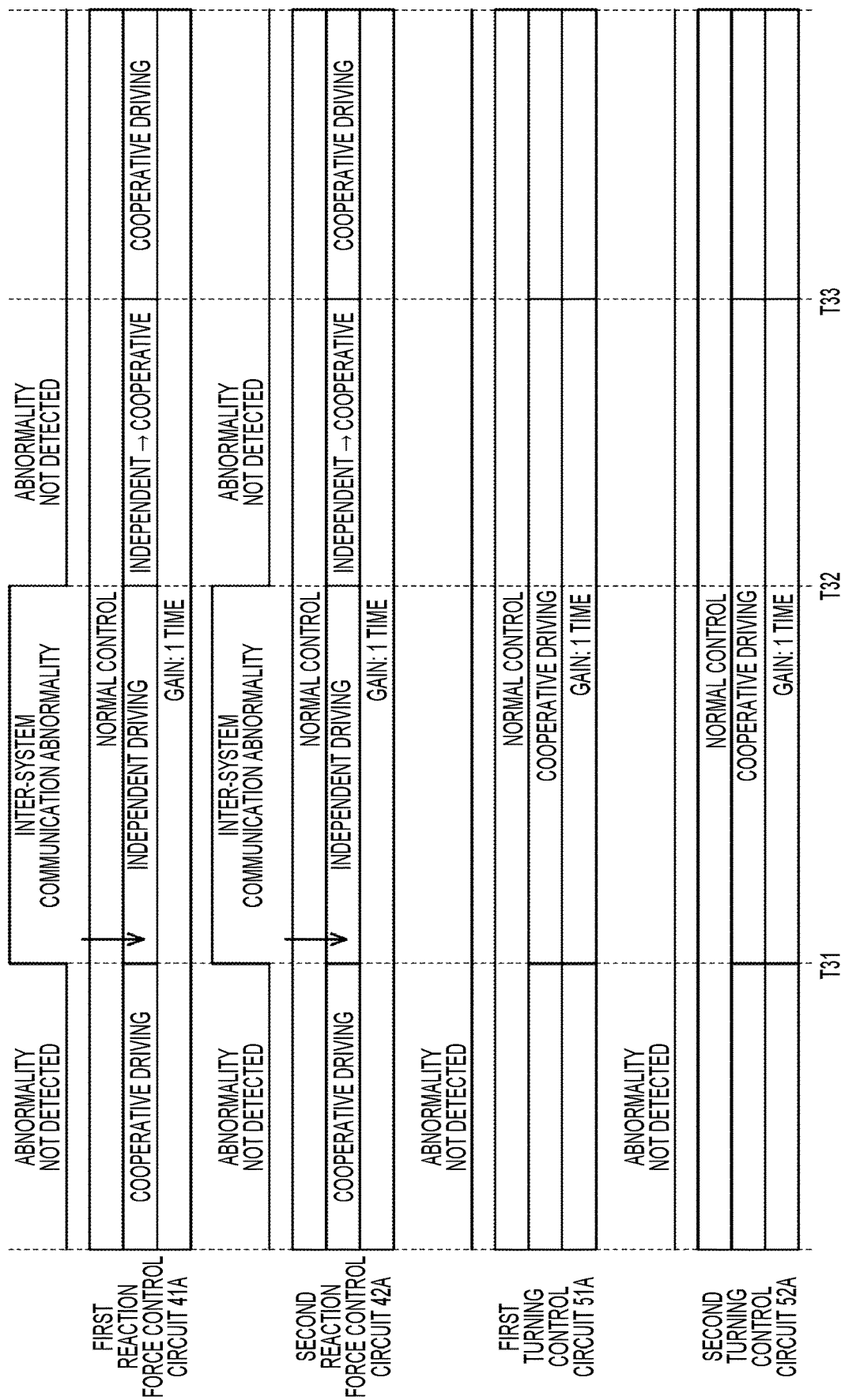

CONTROL DEVICE FOR VEHICLE

CROSS-REFERENCE TO RELATED APPLICATION

This application claims priority to Japanese Patent Application No. 2021-173728 filed on Oct. 25, 2021, incorporated herein by reference in its entirety.

BACKGROUND

1. Technical Field

The disclosure relates to a control device for a vehicle.

2. Description of Related Art

The following control device for a vehicle is known. For example, an electronic control unit (ECU) disclosed in Japanese Unexamined Patent Application Publication No. 2021-035072 (JP 2021-035072 A) controls a motor of an electric power steering device mounted on a vehicle. The motor includes windings of two systems. The ECU includes inverter units of two systems and controllers of two systems. The controller of each system controls energization of the winding of its own system through the inverter unit of its own system.

The controller of one system can communicate with the controller of the other system. The controller has a mode selector and a drive controller. The mode selector selects a motor driving mode. As the driving mode, a cooperative driving mode as a first driving mode and an independent driving mode as a second driving mode are included. The cooperative driving mode is a driving mode in which a value calculated by the controller of the own system and a value acquired from the controller of the other system are used in common. The independent driving mode is a driving mode that does not use a value acquired from the controller of the other system.

The mode selector normally selects the cooperative driving mode. The mode selector shifts the driving mode from the cooperative driving mode to the independent driving mode when an abnormality occurs, that is, when at least one transition determination item satisfies an independent transition condition. In addition, when the abnormality is resolved, that is, when the transition determination item satisfies a return permission condition and a return permission determination item different from the transition determination item satisfies the return permission condition, the mode selector returns the driving mode from the independent driving mode to the cooperative driving mode.

As the transition determination item, a deviation of current command values calculated by the controllers of the systems, a limit value for the current command value, and a communication state between the controllers of the systems are included. As the return permission determination item, a steering torque and a vehicle speed are included. The return permission determination item is a determination item related to the steering state of a steering wheel or vehicle behavior.

The drive controller of each system controls an inverter unit of its own system in the driving mode selected by the mode selector.

SUMMARY

In the ECU disclosed in JP 2021-035072 A, even if the transition determination item satisfies the cooperative return determination condition in a state in which the independent driving mode is selected, the return to the cooperative driving mode is not performed when the return permission determination item does not satisfy the return permission condition. As a consequence, certainly, it may be possible to appropriately return the driving mode from the independent driving mode to the cooperative driving mode.

However, when an abnormality is resolved, there are some cases where the driving mode of the motor is needed to be quickly returned from the independent driving mode to the cooperative driving mode. In this regard, in JP 2021-035072 A, in a situation in which the transition determination item satisfies the return permission condition, when the return permission determination item different from the transition determination item does not satisfy the return permission condition, the return to the cooperative driving mode is not performed. For this reason, there is a possibility that the driving mode of the motor may not be quickly return to the cooperative driving mode.

From the viewpoint of quickly returning the driving mode to the cooperative driving mode, it is conceivable to omit or relax the return permission condition. For example, the determination item related to the steering state is omitted. However, at a timing when the driving mode is returned from the independent driving mode to the cooperative driving mode, there is a possibility that the motor torque fluctuates rapidly when the current command values calculated by the controllers of the systems are different. For this reason, there is a concern that a driver may feel uncomfortable.

It is desirable to, when the abnormality is resolved, quickly return from the independent driving mode to the cooperative driving mode without giving the driver the uncomfortable feeling.

A first aspect of the disclosure relates to a control device for a vehicle. The control device includes control circuits of a plurality of systems that calculate a current command value according to torque to be generated by a motor including winding groups of a plurality of systems, and control electric power supply to the winding groups of the systems independently for each system based on the calculated current command value. The control circuits of the systems have a master-slave relationship, and have a first driving mode and a second driving mode. In the first driving mode, electric power supply to the winding groups of the control circuits' own systems is controlled by using a current command value calculated by the control circuit serving as a master. In the second driving mode, current command values personally calculated by the control circuits are adjusted and electric power supply to the winding groups of the control circuits' own systems is controlled based on the adjusted current command values. When a predetermined transition condition is established, the control circuits of the systems make transition of a driving mode from the first driving mode to the second driving mode, and when a predetermined return condition is established in a state in which the driving mode has transitioned to the second driving mode, the control circuits of the systems make transition of the driving mode from the second driving mode to the first driving mode while gradually changing the current command values of the control circuits' own systems toward the current command value before the adjustment.

With the aspect, when the return condition is established, the driving mode can rapidly transition from the second driving mode to the first driving mode. In this case, the current command values of the control circuits' own systems gradually change toward the current command values before the adjustment. Since the rapid changes in the current command values of the control circuits' own systems are suppressed, torque fluctuations of the motor can be suppressed.

In the above aspect, the control circuit serving as a slave may calculate a current command value of the control circuit serving as the slave's own system by multiplying a current command value personally calculated by the control circuit serving as the slave and the current command value calculated by the control circuit serving as the master by distribution gains that are individually set to define a distribution ratio and adding results obtained from the multiplication, and when the return condition is established in the state in which the driving mode has transitioned to the second driving mode, the control circuit serving as the slave may gradually decrease a value of the distribution gain for the current command value personally calculated by the control circuit serving as the slave, and gradually increase a value of the distribution gain for the current command value calculated by the control circuit serving as the master.

With the configuration, when the return condition is established in the state in which the driving mode has transitioned to the second driving mode, the control circuit serving as the slave can gradually change the current command value of the control circuit serving as the slave's own system toward the current command value calculated by the control circuit serving as the master, by gradually changing the values of the distribution gains for the current command values calculated by the control circuit serving as the slave and the control circuit serving as the master.

In the above aspect, the control circuits of the systems may be able to adjust the control circuits' own current command values by multiplying the current command values personally calculated by the control circuits by output gains that are individually set, when transition of the driving mode from the first driving mode to the second driving mode is made, the control circuits of the systems may set values of the output gains for the control circuits' own current command values to values smaller than or larger than values in the first driving mode, and when the return condition is established in the state in which the driving mode has transitioned to the second driving mode, the control circuits of the systems may gradually change the values of the output gains for the control circuits' own current command values toward values of the output gains in the first driving mode.

With the configuration, when the return condition is established in the state in which the driving mode has transitioned to the second driving mode, the value of the output gain for the current command value calculated by each of the control circuits of the systems is gradually changed toward the value of the output gain in the first driving mode. Therefore, when the driving mode is returned from the second driving mode to the first driving mode, a rapid change in the current command value of each system is suppressed.

In the above configuration, when an abnormality occurs in any one of the systems, the control circuits of the systems may make transition of the driving mode from the first driving mode to the second driving mode, set the value of the output gain for the current command value of the control circuit of an abnormal system to a value smaller than that in the first driving mode, and set the value of the output gain for the current command value of the control circuit of a normal system to a value larger than that in the first driving mode.

With the configuration, it is possible to secure the total current command value for the motor while the influence of the current command value of the abnormal system is suppressed. In the above aspect, the control circuits of the systems may each include a limit processor that limits the current command value to a value within a predetermined allowable range.

With the configuration, it is possible to limit an excessive current command value. In the above configuration, the limit processor may have a limit value set based on a limit value of the allowable range and adjust the limit value between a first limit value and a second limit value that is a value smaller than the first limit value, the limit processor may set the second limit value as the limit value when the driving mode is the first driving mode and set the first limit value as the limit value when the driving mode is the second driving mode, and the limit processor may gradually change the limit value from the first limit value toward the second limit value when the driving mode transitions from the second driving mode to the first driving mode.

With the configuration, the current command value of the control circuit's own system can be changed more smoothly toward the current command value of the other system while a rapid change in the current command value of the control circuit's own system is suppressed. In the above aspect, the motor may include a reaction motor that includes winding groups of two systems and generates a steering reaction force applied to a steering wheel that is separated from turning wheels of the vehicle in power transmission, and a turning motor that includes winding groups of two systems and generates a turning force for turning the turning wheels of the vehicle, the control circuits may include a first reaction force control circuit for controlling electric power supply to a winding group of a first system of the reaction motor, a second reaction force control circuit for controlling electric power supply to a winding group of a second system of the reaction motor, a first turning control circuit for controlling electric power supply to a winding group of a first system of the turning motor, and a second turning control circuit for controlling electric power supply to a winding group of a second system of the turning motor, and the control circuits may make transition of the driving mode from the first driving mode to the second driving mode when an abnormality occurs in communication between the first reaction force control circuit and the first turning control circuit.

With the configuration, in the control circuits of two systems for controlling driving of the reaction motor including the winding groups of two systems and the control circuit of two systems for controlling driving of the turning motor including the winding groups of two systems, it is possible to obtain the same actions and effects as the actions and effects of the control device.

In the above aspect, the motor may be an assist motor that generates an assist force for assisting operation of a steering wheel, the assist motor may include a winding group of a first system and a winding group of a second system, the control circuits may include a first assist control circuit for controlling electric power supply to the winding group of the first system, and a second assist control circuit for controlling electric power supply to the winding group of the second system, and the control circuits may make transition of the driving mode from the first driving mode to the second driving mode when an abnormality occurs in communication between the first assist control circuit and the second assist control circuit.

With the configuration, in the assist control circuit of two systems for controlling driving of the assist motor, which includes the winding groups of two systems, it is possible to obtain the same actions and effects as the actions and effects of the control device.

According to the above aspect, it is possible to quickly return the driving mode of the motor from the second driving mode to the first driving mode while torque fluctuations of the motor are suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5A is a block diagram showing a state of the control circuit in an independent driving mode in the first embodiment;

FIG. 5B is a block diagram showing a state of the control circuit at the time of transition from the independent driving mode to a cooperative driving mode in the first embodiment;

FIG. 6 is a time chart showing a first pattern of state transition of each control circuit in the first embodiment;

FIG. 9 is a time chart showing a second pattern of state transition of each control circuit in the first embodiment;

DETAILED DESCRIPTION OF EMBODIMENTS

First Embodiment

Hereinafter, a first embodiment in which a control device for a vehicle is embodied as a steer-by-wire type steering device will be described.

Figure 1:
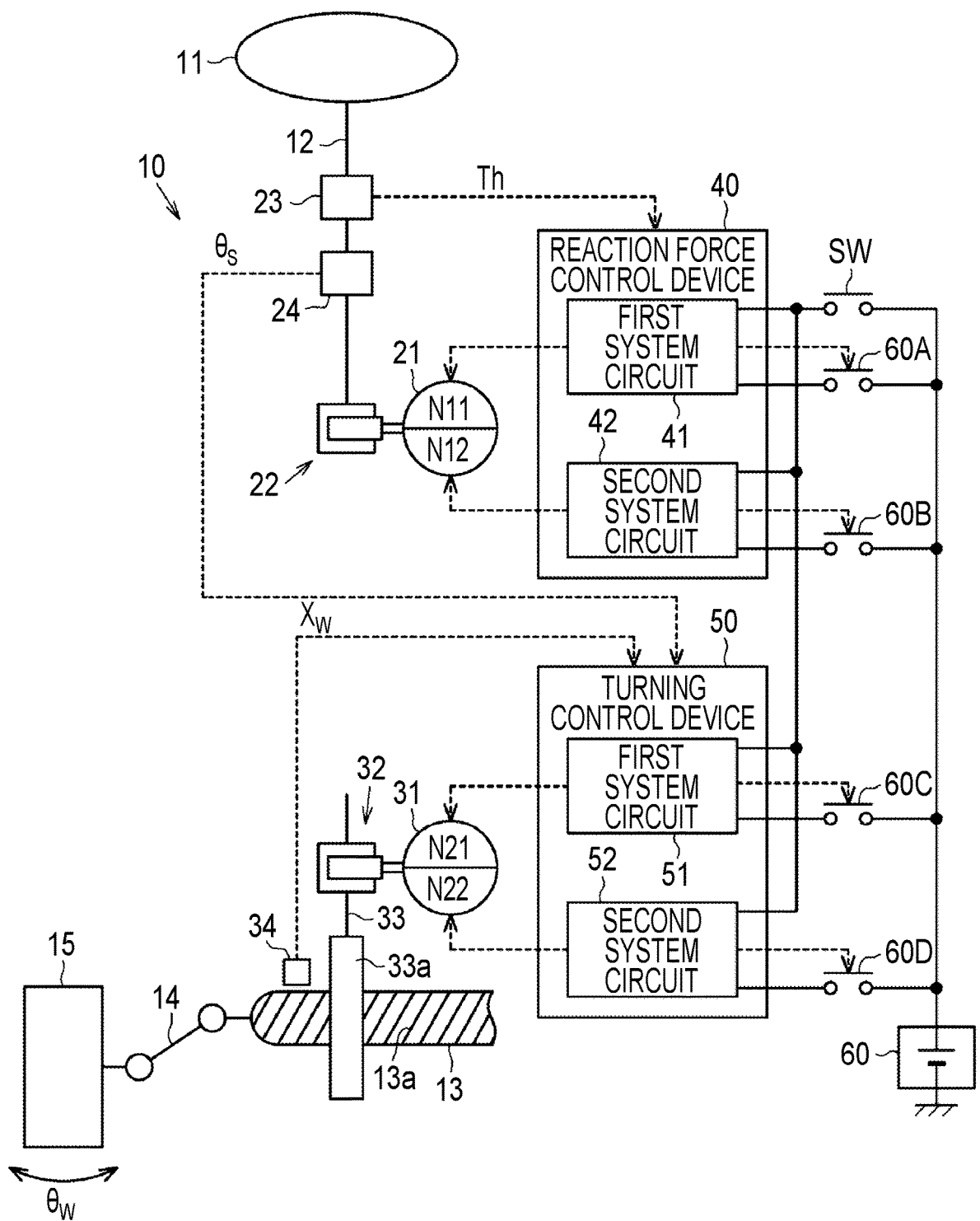
FIG. 1 is a configuration diagram of a steer-by-wire type steering device equipped with a control device for a vehicle according to a first embodiment.

As shown in FIG. 1, a steering device 10 of a vehicle has a steering shaft 12 connected to a steering wheel 11. Further, the steering device 10 has a turning shaft 13 extending along a vehicle width direction (right and left direction in FIG. 1).

Both ends of the turning shaft 13 are connected to turning wheels 15 through tie rods 14, respectively. A turning angle $\theta w$ of the turning wheel 15 is changed by the linear motion of the turning shaft 13. The steering shaft 12 and the turning shaft 13 constitute a steering mechanism of the vehicle. It should be noted that FIG. 1 shows just the turning wheel 15 on one side.

The steering device 10 has a reaction motor 21 and a speed reduction mechanism 22. The reaction motor 21 is a source of a steering reaction force. The steering reaction force refers to a force acting in the direction opposite to the operating direction of the steering wheel 11 by a driver. A rotating shaft of the reaction motor 21 is connected to the steering shaft 12 through a speed reduction mechanism 22. A torque of the reaction motor 21 is applied to the steering shaft 12 as a steering reaction force. By applying the steering reaction force to the steering wheel 11, it is possible to give the driver an appropriate feeling of response.

The reaction motor 21 is, for example, a three-phase brushless motor. The reaction motor 21 has a winding group N11 of a first system and a winding group N12 of a second system. The winding group N11 of the first system and the winding group N12 of the second system are wound around a common stator (not shown). The electrical characteristics of the winding group N11 of the first system and the winding group N12 of the second system are the same.

The steering device 10 has a turning motor 31 and the speed reduction mechanism 32. The turning motor 31 is a source of a turning force. The turning force refers to power for turning the turning wheel 15. The rotating shaft of the turning motor 31 is connected to a pinion shaft 33 through the speed reduction mechanism 32. Pinion teeth 33a of the pinion shaft 33 are meshed with rack teeth 13a of the turning shaft 13. The torque of the turning motor 31 is applied to the turning shaft 13 as a turning force through the pinion shaft 33. As the turning motor 31 rotates, the turning shaft 13 moves in the vehicle width direction.

The turning motor 31 is, for example, a three-phase brushless motor. The turning motor 31 has a winding group N21 of the first system and a winding group N22 of the second system. The winding group N21 of the first system and the winding group N22 of the second system are wound around a common stator (not shown). The electrical characteristics of the winding group N21 of the first system and the winding group N22 of the second system are the same.

The steering device 10 has a reaction force control device 40. The reaction force control device 40 controls driving of the reaction motor 21 to be controlled. The reaction force control device 40 executes reaction force control for causing the reaction motor 21 to generate a steering reaction force according to a steering torque Th. The reaction force control device 40 calculates a target steering reaction force based on the steering torque Th detected through a torque sensor 23. The torque sensor 23 is provided on the steering shaft 12. The reaction force control device 40 controls electric power supply to the reaction motor 21 to match the actual steering reaction force applied to the steering shaft 12 with the target steering reaction force. The reaction force control device controls electric power supply to the winding groups of the two systems in the reaction motor 21 independently for each system.

The reaction force control device 40 has a first system circuit 41 and a second system circuit 42. The first system circuit 41 controls electric power supply to the winding group N11 of the first system in the reaction motor 21 according to the steering torque Th detected through the torque sensor 23. The second system circuit 42 controls electric power supply to the winding group N12 of the second system in the reaction motor 21 according to the steering torque Th detected through the torque sensor 23.

The steering device 10 has a turning control device 50. The turning control device 50 controls driving of the turning motor 31 to be controlled. The turning control device 50 executes turning control for causing the turning motor 31 to generate a turning force for turning the turning wheel 15 according to a steering state. The turning control device 50 takes in a steering angle θs detected through a steering angle sensor 24 and a stroke Xw of the turning shaft 13 detected through a stroke sensor 34. The stroke Xw is the amount of displacement of the turning shaft 13 with respect to its neutral position, and is a state variable in which the turning angle θw is reflected. The steering angle sensor 24 is provided between the torque sensor 23 of the steering shaft 12 and the speed reduction mechanism 22. The stroke sensor 34 is provided near the turning shaft 13.

The turning control device 50 calculates a target turning angle of the turning wheel 15 based on the steering angle θs detected through the steering angle sensor 24. The turning control device 50 calculates the turning angle θw based on the stroke Xw of the turning shaft 13 detected through the stroke sensor 34. The turning control device 50 controls electric power supply to the turning motor 31 to match the turning angle θw calculated based on the stroke Xw to the target turning angle. The turning control device 50 controls electric power supply to the winding groups of the two systems in the turning motor 31 independently for each system.

The turning control device 50 has a first system circuit 51 and a second system circuit 52. The first system circuit 51 controls electric power supply to the winding group N21 of the first system in the turning motor 31 based on the steering angle θs detected through the steering angle sensor 24 and the stroke Xw of the turning shaft 13 detected through the stroke sensor 34. The second system circuit 52 controls electric power supply to the winding group N22 of the second system in the turning motor 31 based on the steering angle θs detected through the steering angle sensor 24 and the stroke Xw of the turning shaft 13 detected through the stroke sensor 34.

By integrally providing the reaction force control device 40 and the reaction motor 21, a so-called electromechanical integrated reaction force actuator may be configured. Further, by integrally providing the turning control device 50 and the turning motor 31, a so-called electromechanically integrated turning actuator may be configured.

Electric Power Supply Path

Next, electric power supply paths for the reaction force control device 40 and the turning control device 50 will be described. Various in-vehicle control devices including the reaction force control device 40 and the turning control device 50 are supplied with electric power from a direct current (DC) power supply 60 mounted in the vehicle. The DC power supply 60 is, for example, a battery. Various sensors including the torque sensor 23, steering angle sensor 24 and stroke sensor 34 are also supplied with electric power from the DC power supply 60.

The first system circuit 41 and the second system circuit 42 of the reaction force control device 40, and the first system circuit 51 and the second system circuit 52 of the turning control device 50 are connected to the DC power supply 60 through respective start switches SW of the vehicle. The start switch SW is, for example, an ignition switch or a power switch. The start switch SW is operated at the time of starting or stopping a drive source for vehicle travelling, such as an engine. When the start switches SW are turned on, electric power from DC power supply 60 is supplied to first system circuit 41 and second system circuit 42 of the reaction force control device 40 and to first system circuit 51 and the second system circuit 52 of the turning control device 50 through the start switches SW, respectively. "Turning on the start switch SW" refers to turning on the vehicle power supply. "Turning off the start switch SW" refers to "turning off the vehicle power supply".

The first system circuit 41 and the second system circuit 42 of the reaction force control device 40 and the first system circuit 51 and the second system circuit 52 of the turning control device 50 are connected to the DC power supply 60 through power relays 60A, 60B, 60C, 60D. When power relays 60A, 60B, 60C, 60D are turned on, electric power from the DC power supply 60 is supplied to first system circuit 41 and second system circuit 42 of reaction force control device 40 and the first system circuit 51 and the second system circuit 52 of the turning control device 50 through the power relays 60A, 60B, 60C, 60D.

The first system circuit 41 of the reaction force control device 40 controls on/off of the power relay 60A. The first system circuit 41 executes power latch control for maintaining the power relay 60A at an on state for a predetermined period when the start switch SW is turned off from on. Therefore, the first system circuit 41 can operate even after the start switch SW is turned off. The first system circuit 41 can cut off electric power supply to the first system circuit 41 itself by switching the power relay 60A from on to off after a predetermined period of time has elapsed.

The first system circuit 41 detects on/off of the start switch SW, for example, by monitoring the voltage across the start switch SW. The first system circuit 41 detects on of the start switch SW when the voltage across the start switch SW falls below a predetermined voltage threshold. The first system circuit 41 detects off of the start switch SW when the voltage across the start switch SW is equal to or higher than the predetermined voltage threshold.

The second system circuit 42 of the reaction force control device 40 controls on/off of the power relay 60B. The second system circuit 42, like the first system circuit 41, executes power latch control. The second system circuit 42 maintains the power relay 60B in the on state for a predetermined period when the start switch SW is turned off from on.

The first system circuit 51 of the turning control device 50 controls on/off of the power relay 60C. The first system circuit 51 executes power latch control in the same manner as the first system circuit 41 of the reaction force control device 40. The first system circuit 51 maintains the power relay 60C in the on state for a predetermined period when the start switch SW is turned off from on.

The second system circuit 52 of the turning control device 50 controls on/off of the power relay 60D. The second system circuit 52 executes power latch control in the same manner as the first system circuit 41 of the reaction force control device 40. The second system circuit 52 maintains the power relay 60D in the on state for a predetermined period when the start switch SW is turned off from on.

Among the components of the steering device 10, such as the torque sensor 23, the steering angle sensor 24, and the stroke sensor 34, the components needed to operate even after the start switch SW is turned off are connected to the DC power supply 60 through at least one of the power relays 60A, 60B, 60C, 60D. Therefore, even when the start switch SW is turned off, when at least one of the power relays 60A, 60B, 60C, 60D is turned on, electric power continues to be supplied to each of components such as the torque sensor 23, the steering angle sensor 24, or the stroke sensor 34.

Reaction Force Control Device

Figure 2:
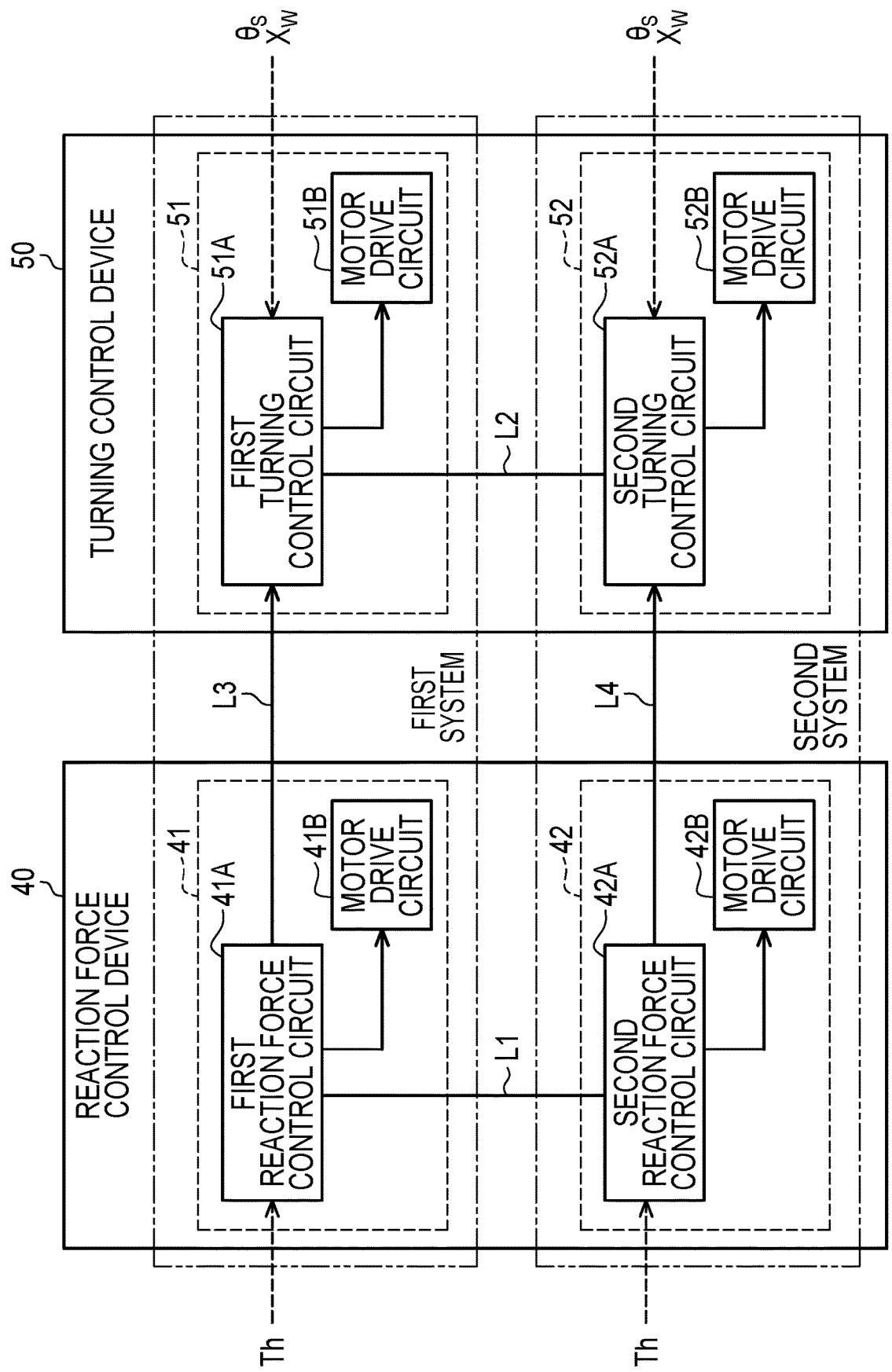
FIG. 2 is a block diagram of a reaction force control device and a turning control device according to the first embodiment.

Next, a configuration of the reaction force control device will be described in detail. As shown in FIG. 2, the reaction force control device 40 includes the first system circuit 41 and the second system circuit 42. The first system circuit 41 includes a first reaction force control circuit 41A and a motor drive circuit 41B. The second system circuit 42 includes a second reaction force control circuit 42A and a motor drive circuit 42B.

The first reaction force control circuit 41A is constituted by 1) one or more processors that operate according to a computer program (software), 2) one or more dedicated hardware circuits, such as application specific integrated circuits (ASICs), that execute at least some of the various processes, and 3) combinations thereof. The processor includes a central processing unit (CPU). The processor also includes memory such as random-access memory (RAM) and read-only memory (ROM). The memory stores program codes or instructions configured to cause the CPU to execute processes. The memory, that is, non-transitory computer-readable medium, includes any available media that can be accessed by a general purpose or special purpose computer.

The first reaction force control circuit 41A calculates a target steering reaction force to be generated by the reaction motor 21 based on the steering torque Th detected through the torque sensor 23, and calculates a first current command value for the winding group N11 of the first system according to the calculated target steering reaction force value. Note that, the first current command value is set to a value half (50%) of the amount of current (100%) needed to cause the reaction motor 21 to generate the target steering reaction force. The first reaction force control circuit 41A generates a drive signal (pulse width modulation (PWM) signal) for the motor drive circuit 41B by executing current feedback control for making the value of the actual current supplied to the winding group N11 of the first system follow the first current command value.

The motor drive circuit 41B is a PWM inverter having three legs connected in parallel, where the leg is obtained by setting, as a basic unit, two switching elements, such as field effect transistors (FETs), connected in series, and the three legs correspond to respective three phases (U, V, W). The motor drive circuit 41B converts the DC power supplied from the DC power supply 60 into three-phase alternating current (AC) power by switching the switching elements of each phase based on the drive signal generated by the first reaction force control circuit 41A. The three-phase AC power generated by the motor drive circuit 41B is supplied to the winding group N11 of the first system of the reaction motor 21 through an electric power supply path for each phase, which is formed of a busbar, a cable, or the like. In this way, the winding group N11 of the first system generates torque according to the first current command value.

The second reaction force control circuit 42A basically has the same configuration as the first reaction force control circuit 41A. The second reaction force control circuit 42A calculates a target steering reaction force to be generated by the reaction motor 21 based on the steering torque Th detected through the torque sensor 23, and calculates a second current command value for the winding group N12 of the second system according to the calculated target steering reaction force value. Note that, the second current command value is set to a value half (50%) of the amount of current needed to cause the reaction motor 21 to generate the target steering reaction force. The second reaction force control circuit 42A generates a drive signal for the motor drive circuit 42B by executing current feedback control for making the value of the actual current supplied to the winding group N12 of the second system follow the second current command value.

The motor drive circuit 42B basically has the same configuration as the motor drive circuit 41B. The motor drive circuit 42B converts the DC power supplied from the DC power supply 60 into three-phase AC power based on the drive signal generated by the second reaction force control circuit 42A. The three-phase AC power generated by the motor drive circuit 42B is supplied to the winding group N12 of the second system of the reaction motor 21 through the electric power supply path for each phase, which is formed of a busbar, a cable, or the like. In this way, the winding group N12 of the second system generates torque according to the second current command value. The reaction motor 21 generates a total torque of the torque generated by the winding group N11 of the first system and the torque generated by the winding group N12 of the second system.

Note that there is a master-slave relationship between the first system circuit 41 and the second system circuit 42 of the reaction force control device 40. In this case, for example, the first system circuit 41 functions as a master and the second system circuit 42 functions as a slave.

Turning Control Device

Next, a configuration of the turning control device 50 will be described in detail. As shown in FIG. 2, the turning control device 50 has the first system circuit 51 and the second system circuit 52. The first system circuit 51 includes a first turning control circuit 51A and a motor drive circuit 51B. The second system circuit 52 includes a second turning control circuit 52A and a motor drive circuit 52B.

The first turning control circuit 51A basically has the same configuration as the first reaction force control circuit 41A. The first turning control circuit 51A calculates a target turning angle of the turning wheel 15 based on the steering angle θs detected by the steering angle sensor 24. The turning control device 50 calculates the turning angle θw based on the stroke Xw of the turning shaft 13 detected through the stroke sensor 34. The first turning control circuit 51A calculates a target turning force to be generated by the turning motor 31 through execution of angle feedback control for making the turning angle θw calculated based on the stroke Xw follow the target turning angle, and calculates a third current command value for the winding group N21 of the first system of the turning motor 31 according to a value of the calculated target turning force. Note that, the third current command value is set to a value half (50%) of the amount of current needed to cause the turning motor 31 to generate the target turning force. The first turning control circuit 51A generates a drive signal for the motor drive circuit 51B by executing current feedback control for making the value of the actual current supplied to the winding group N21 of the first system follow the third current command value.

The motor drive circuit 51B basically has the same configuration as the motor drive circuit 41B. The motor drive circuit 51B converts the DC power supplied from the DC power supply 60 into three-phase AC power based on the drive signal generated by the first turning control circuit 51A. The three-phase AC power generated by the motor drive circuit 42B is supplied to the winding group N21 of the first system of the turning motor 31 through an electric power supply path for each phase, which is formed of a busbar, a cable, or the like. In this way, the winding group N21 of the first system generates torque according to the third current command value.

The second turning control circuit 52A basically has the same configuration as the first reaction force control circuit 41A. The second turning control circuit 52A calculates a target turning angle of the turning wheel 15 based on the steering angle θs detected by the steering angle sensor 24. The turning control device 50 calculates the turning angle θw based on the stroke Xw of the turning shaft 13 detected through the stroke sensor 34. The second turning control circuit 52A calculates a target turning force to be generated by the turning motor 31 through execution of angle feedback control for making the turning angle θw calculated based on the stroke Xw follow the target turning angle, and calculates a fourth current command value for the winding group N22 of the second system of the turning motor 31 according to a value of the calculated target turning force. Note that, the fourth current command value is set to a value half (50%) of the amount of current needed to cause the turning motor 31 to generate the target turning force. The second turning control circuit 52A generates a drive signal for the motor drive circuit 52B by executing current feedback control for making the value of the actual current supplied to the winding group N22 of the second system follow the fourth current command value.

The motor drive circuit 52B basically has the same configuration as the motor drive circuit 41B. The motor drive circuit 51B converts the DC power supplied from the DC power supply 60 into three-phase AC power based on the drive signal generated by the second turning control circuit 52A. The three-phase AC power generated by the motor drive circuit 52B is supplied to the winding group N22 of the second system of the turning motor 31 through the electric power supply path for each phase, which is formed of a busbar, a cable, or the like. In this way, the winding group N22 of the second system generates torque according to the fourth current command value. The turning motor 31 generates a total torque of the torque generated by the winding group N21 of the first system and the torque generated by the winding group N22 of the second system.

Note that there is a master-slave relationship between the first system circuit 51 and the second system circuit 52 of the turning control device 50. In this case, for example, the first system circuit 51 functions as a master and the second system circuit 52 functions as a slave.

Communication Path

Next, inner communication paths inside the reaction force control device and the turning control device 50 and communication paths between the reaction force control device 40 and the turning control device 50 will be described.

As shown in FIG. 2, the first reaction force control circuit 41A and the second reaction force control circuit 42A exchange information with each other through a communication line L1. The information includes abnormality information for the first reaction force control circuit 41A, the second reaction force control circuit 42A, or the motor drive circuits 41B, 42B. The information also includes flag values indicating various states. The first reaction force control circuit 41A and the second reaction force control circuit 42A cooperatively control the driving of the reaction motor 21 based on the information exchanged with each other.

The first turning control circuit 51A and the second turning control circuit 52A exchange information with each other through a communication line L2. The information includes abnormality information for the first turning control circuit 51A, the second turning control circuit 52A, or the motor drive circuits 51B, 52B. The information also includes flag values indicating various states. The first turning control circuit 51A and the second turning control circuit 52A cooperatively and control driving of the turning motor 31 based on the information exchanged with each other.

The first reaction force control circuit 41A and the first turning control circuit 51A exchange information with each other through a communication line L3. The information includes abnormality information for the first reaction force control circuit 41A, the first turning control circuit 51A, and the motor drive circuits 41B, 51B. The information also includes flag values indicating various states. The first reaction force control circuit 41A and the first turning control circuit 51A operate in cooperation based on information exchanged with each other.

The second reaction force control circuit 42A and the second turning control circuit 52A exchange information with each other through a communication line L4. The information includes abnormality information for the second reaction force control circuit 42A, the second turning control circuit 52A, or the motor drive circuits 42B, 52B. The information also includes flag values indicating various states. The second reaction force control circuit 42A and the second turning control circuit 52A operate in cooperation based on information exchanged with each other.

Driving Mode of Motor

Next, driving modes of the reaction motor 21 and the turning motor 31 will be described. The driving mode includes a cooperative driving mode, an independent driving mode, and a single-system driving mode. Note that the cooperative driving mode corresponds to the first driving mode. The independent driving mode and the single-system driving mode correspond to the second driving mode.

The cooperative driving mode is a normal driving mode in which the first system circuits 41, 51 and the second system circuits 42, 52 are operating normally. The first system circuit 41 and the second system circuit 42 share information such as the command value and the limit value, and generate equivalent torque in both the winding group N11 of the first system and the winding group N12 of the second system of the reaction motor 21. The first system circuit 51 and the second system circuit 52 share information such as the command value and the limit value, and generate equivalent torque in both the winding group N21 of the first system and the winding group N22 of the second system of the turning motor 31.

In a case where there is a master-slave relationship between the first system circuit 41 and the second system circuit 42 of the reaction force control device 40, when the cooperative driving mode is selected for the driving mode, a slave uses the command value calculated by a master to control driving of the reaction motor 21. Further, in a case where there is a master-slave relationship between the first system circuit 51 and the second system circuit 52 of the turning control device 50, when the cooperative driving mode is selected for the driving mode, a slave uses the command value calculated by a master to control the driving of the turning motor 31.

The independent driving mode is a driving mode where the operation of any one of the four control circuits 41A, 42A, 51A, 52A has stopped momentarily, but the abnormality is not confirmed and there is a possibility of returning to normal operation accordingly. In the independent driving mode, for example, when one control circuit that has stopped its operation has a possibility of returning to normal operation, the remaining three control circuits generate torque in their corresponding winding groups based on their own calculation results without using information through inter-system communication.

In the case where there is the master-slave relationship between the first system circuit 41 and the second system circuit 42 of the reaction force control device 40, when the independent driving mode is selected for the driving mode, the master-slave relationship between the first system circuit 41 and the second system circuit 42 is temporarily dissolved. Further, in the case where there is the master-slave relationship between the first system circuit 51 and the second system circuit 52 of the turning control device 50, when the independent driving mode is selected for the driving mode, the master-slave relationship between the first system circuit 51 and the second system circuit 52 is temporarily dissolved.

The single-system driving mode is a driving mode in which an abnormality in any one of the four control circuits 41A, 42A, 51A, 52A is confirmed and has no possibility of returning to normal operation. For example, when the first system circuits 41, 51 are confirmed to be abnormal, the second system circuits 42, 52 alone generate torque in the reaction motor 21 and the turning motor 31. When the second system circuits 42, 52 are confirmed to be abnormal, the first system circuits 41, 51 alone generate torque in the reaction motor 21 and the turning motor 31.

In the case where there is the master-slave relationship between the first system circuit 41 and the second system circuit 42 of the reaction force control device 40, when the single-system driving mode is selected for the driving mode, the master-slave relationship between the first system circuit 41 and the second system circuit 42 is temporarily dissolved. Further, in the case where there is the master-slave relationship between the first system circuit 51 and the second system circuit 52 of the turning control device 50, when the single-system driving mode is selected for the driving mode, the master-slave relationship between the first system circuit 51 and the second system circuit 52 is temporarily dissolved.

Each of the control circuits 41A, 42A, 51A, 52A controls driving of the motors 21, 31 in the cooperative driving mode in normal times when no abnormality occurs. Each control circuit switches the driving mode from the cooperative driving mode to the independent driving mode when an abnormality determination condition is established in a state in which the cooperative driving mode is selected for the driving mode. Further, each control circuit returns the driving mode from the independent driving mode to the cooperative driving mode when the return determination condition is established before the abnormality is confirmed in a state in which the independent driving mode is selected for the driving mode. Further, each control circuit switches the driving mode from the independent driving mode to the single-system driving mode when an abnormality confirmation condition is established in the state in which the independent driving mode is selected for the driving mode.

Abnormalities include temporary ones that are considered recoverable, such as communication abnormalities between systems, communication abnormalities within the same system, deviation of command values between systems, reductions in current limit values, or the like. The abnormality determination condition corresponds to a transition condition for making transition of the driving mode from the cooperative driving mode to the independent driving mode. The return determination condition corresponds to a return condition for returning the driving mode from the independent driving mode or the single-system driving mode to the cooperative driving mode.

First Comparative Example of State Transition

Next, a first comparative example of state transition of each control circuit will be described. Here, as an abnormality in which the driving mode is switched to the independent driving mode, a case where a communication abnormality occurs between the first reaction force control circuit 41A and the first turning control circuit 51A is taken as an example. Note that, communication between the first reaction force control circuit 41A and the second reaction force control circuit 42A is normal. Communication between the first turning control circuit 51A and the second turning control circuit 52A is also normal.

Figure 3:
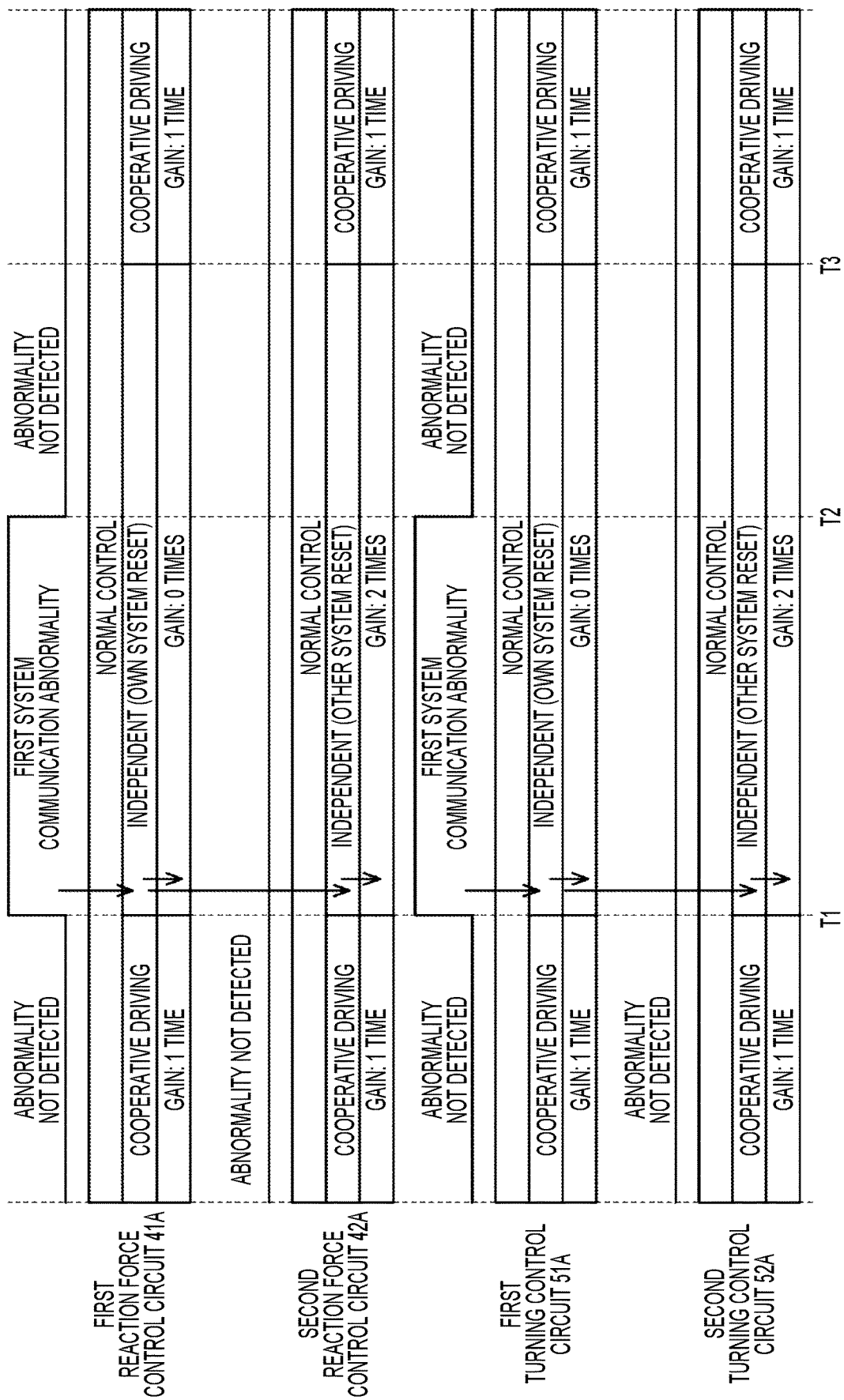
FIG. 3 is a time chart showing a first comparative example of state transition of each control circuit.

As shown in a time chart of FIG. 3, in a case where each of the control circuits 41A, 42A, 51A, 52A controls the driving of the motors 21, 31 in the cooperative driving mode, when a communication abnormality occurs between the first reaction force control circuit 41A and the first turning control circuit 51A (time T1), the driving mode is switched as follows. That is, the first reaction force control circuit 41A and the first turning control circuit 51A switch respective driving modes from the cooperative driving mode to the independent driving mode. Further, the first reaction force control circuit 41A and the first turning control circuit 51A switch gains for the current command values evaluated through respective calculations from "1 time" in a normal control to "0 times".

By multiplying the first current command value calculated by the first reaction force control circuit 41A by the gain "0 times", a final first current command value becomes "0". Further, by multiplying the third current command value calculated by the first turning control circuit 51A by the gain "0 times", a final third current command value also becomes "0". That is, electric power supply to the winding group N11 of the first system of the reaction motor 21 and the winding group N21 of the first system of the turning motor 31 is stopped. Therefore, the winding groups N11, N21 of the first system do not generate torque.

The second reaction force control circuit 42A recognizes through the first reaction force control circuit 41A that a communication abnormality occurs in the first system. The second turning control circuit 52A recognizes through the first turning control circuit 51A that a communication abnormality occurs in the first system.

The second reaction force control circuit 42A and the second turning control circuit 52A switch respective driving modes from the cooperative driving mode to the independent driving mode, when the second reaction force control circuit 42A and the second turning control circuit 52A recognize that the communication abnormality in the first system occurs. Further, the second reaction force control circuit 42A and the second turning control circuit 52A switch gains for the current command values evaluated through respective calculations from "1 time" in the normal control to "2 times".

By multiplying the second current command value calculated by the second reaction force control circuit 42A by the gain "2 times", a final second current command value becomes a value twice the normal value. Further, by multiplying the fourth current command value calculated by the second turning control circuit 52A by the gain "2 times", a final fourth current command value also becomes twice the normal value. That is, it is possible to supply twice as much electric power as normal to the winding group N12 of the second system of the reaction motor 21 and the winding group N22 of the second system of the turning motor 31. Therefore, the winding groups N12, N22 of the second system can generate twice as much torque as normal. Therefore, it is possible to compensate for the decrease in the torque generated by the winding groups N11, N21 of the first system with the torque generated by the winding groups N12, N22 of the second system. Note that, depending on the product specifications, the second current command value and the fourth current command value may be limited to a limit value that is set based on a limit value of a predetermined allowable range when the second current command value and the fourth current command value exceed the allowable range.

Here, when driving of the motors 21, 31 is controlled in the independent driving mode by the second system, it is considered that a communication abnormality in the first system is resolved before the communication abnormality in the first system is confirmed (time T2).

The first reaction force control circuit 41A and the first turning control circuit 51A of the abnormal system return the driving mode from the independent driving mode to the cooperative driving mode when a predetermined return determination condition is established (time T3). The return determination condition includes the resolution of the communication abnormality between the first reaction force control circuit 41A and the first turning control circuit 51A. Further, when the driving mode is returned from the independent driving mode to the cooperative driving mode, the first reaction force control circuit 41A and the first turning control circuit 51A of the abnormal system switch the gains for the current command values evaluated through respective calculations from "0 times" at the time of the abnormality to "1 time" in the normal control.

Accordingly, the second reaction force control circuit 42A and the second turning control circuit 52A of the normal systems return the driving mode from the independent driving mode to the cooperative driving mode. Further, the second reaction force control circuit 42A and the second turning control circuit 52A switch gains for the current command values evaluated through respective calculations from "2 times" at the time of the abnormality to "1 time" in the normal control. The driving modes of the first reaction force control circuit 41A and the second reaction force control circuit 42A are synchronized with each other. The driving modes of the first turning control circuit 51A and the second turning control circuit 52A are synchronized with each other.

However, depending on the return determination condition, a situation may occur in which the driving mode cannot be returned from the independent driving mode to the cooperative driving mode even though the communication abnormality in the first system has been resolved. For example, depending on product specifications, "the steering wheel 11 is steered" may be set as one of items of the return determination condition. In this case, even when the communication abnormality of the first system is resolved, the driving mode does not return to the cooperative driving mode as long as the steering wheel 11 is not steered. That is, as long as the steering wheel 11 is not steered, the driving mode is maintained in the independent driving mode.

The situation in which the steering wheel 11 is not steered includes, for example, a steering state when the vehicle is travelling straight ahead and a steering state when the vehicle is making a steady turn. The determination as to whether or not the steering wheel 11 is being steered is made, for example, based on the steering torque Th. Second Comparative Example of State Transition Next, a second comparative example of state transition of each control circuit will be described. Here, as an abnormality in which the driving mode is switched to the independent driving mode, a case where a communication abnormality occurs between the first reaction force control circuit 41A and the second reaction force control circuit 42A is taken as an example. Note that, communication between the first reaction force control circuit 41A and the first turning control circuit 51A is normal. Communication between the first turning control circuit 51A and the second turning control circuit 52A is also normal.

Figure 4:
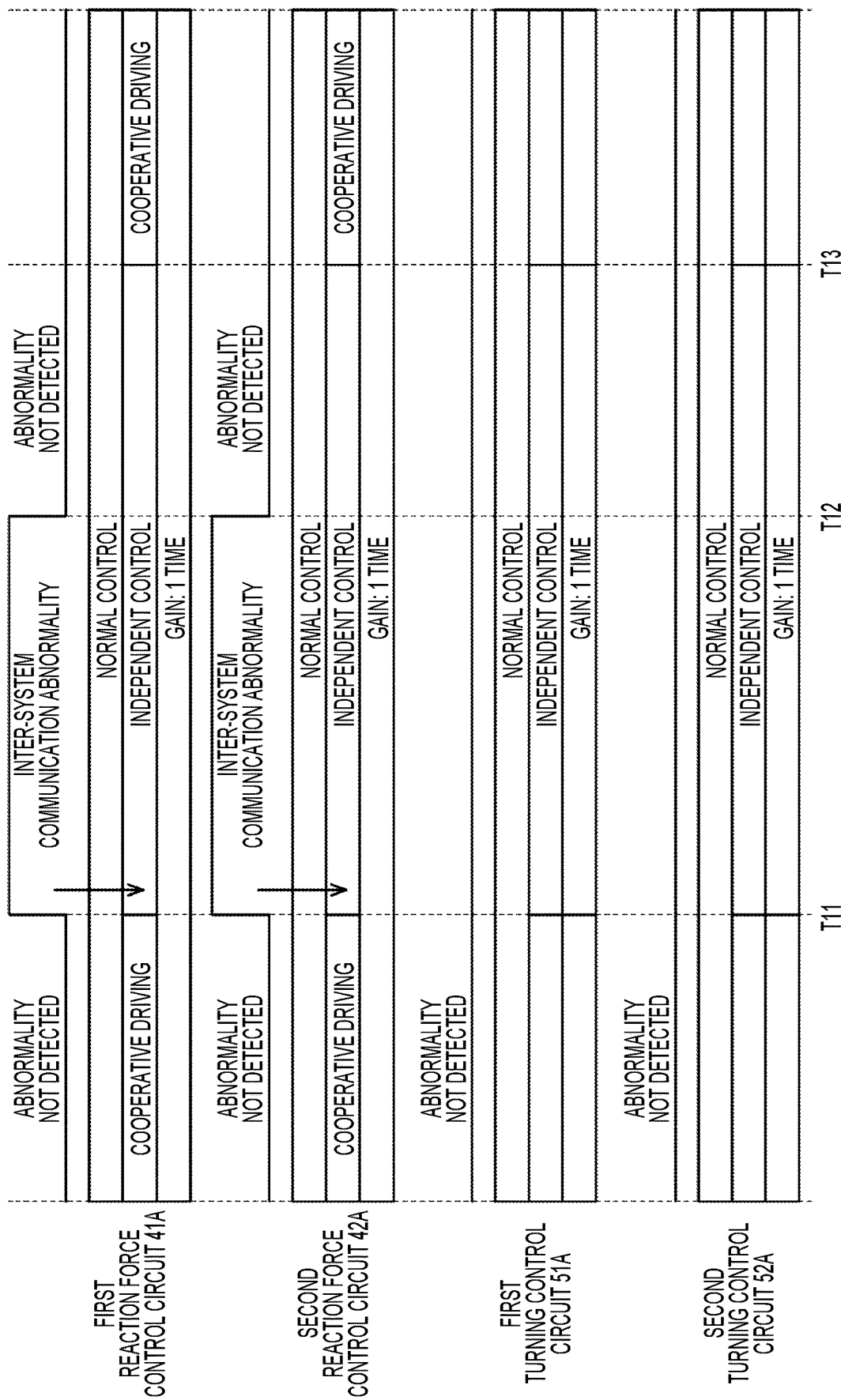
FIG. 4 is a time chart showing a second comparative example of state transition of each control circuit.

As shown in a time chart of FIG. 4, in a case where each of the control circuits 41A, 42A, 51A, 52A controls the driving of the motors 21, 31 in the cooperative driving mode, when a communication abnormality occurs between the first reaction force control circuit 41A and the second reaction force control circuit 42A (time T11), each driving mode is switched as follows. That is, the first reaction force control circuit 41A and the second reaction force control circuit 42A switch respective driving modes from the cooperative driving mode to the independent driving mode.

Note that, the first reaction force control circuit 41A and the second reaction force control circuit 42A maintain the gains for the current command values evaluated through respective calculations at "1 time" in the normal control. Therefore, the first current command value calculated by the first reaction force control circuit 41A becomes the final first current command value as it is. Further, the second current command value calculated by the second reaction force control circuit 42A becomes the final second current command value as it is. That is, the same electric power as that in the normal control is supplied to the winding groups N11, N12 of two systems of the reaction motor 21. Therefore, the winding groups N11, N12 generate the same torque as that in the normal control.

The first turning control circuit 51A recognizes a communication abnormality between the first reaction force control circuit 41A and the second reaction force control circuit 42A through the first reaction force control circuit 41A. The second turning control circuit 52A recognizes the communication abnormality between the first reaction force control circuit 41A and the second reaction force control circuit 42A through the first turning control circuit 51A. Note that, in this case, the first turning control circuit 51A and the second turning control circuit 52A maintain the respective driving modes in the cooperative driving mode. Further, the first turning control circuit 51A and the second turning control circuit 52A maintain the gains for the current command values evaluated through respective calculations at "1 time" in the normal control. That is, the same electric power as that in the normal control is supplied to the winding groups N21, N22 of the two systems of the turning motor 31. Therefore, the winding groups N21, N22 generate the same torque as that in the normal control.

Here, when each of the first reaction force control circuit 41A and the second reaction force control circuit 42A controls the driving of the reaction motor 21 in the independent driving mode, it is considered that the communication abnormality between the first reaction force control circuit 41A and the second reaction force control circuit 42A is resolved before the communication abnormality is confirmed (time T12).

The first reaction force control circuit 41A and the second reaction force control circuit 42A return the driving mode from the independent driving mode to the cooperative driving mode when a predetermined return determination condition is established (time T13). The return determination condition includes resolution of the communication abnormality between the first reaction force control circuit 41A and the second reaction force control circuit 42A.

However, depending on the return determination condition, a situation may occur in which the driving mode cannot be returned from the independent driving mode to the cooperative driving mode even though the communication abnormality between the first reaction force control circuit 41A and the second reaction force control circuit 42A has been resolved. For example, depending on product specifications, "the steering wheel 11 is steered" may be set as one of items of the return determination condition. In this case, even when the communication abnormality between the first reaction force control circuit 41A and the second reaction force control circuit 42A is resolved, the driving mode does not return to the cooperative driving mode as long as the steering wheel 11 is not steered. That is, as long as the steering wheel 11 is not steered, the driving mode is maintained in the independent driving mode.

Configuration of Control Circuit

As described above, depending on items of the return determination condition, when the abnormality is resolved before the abnormality is confirmed, the driving mode may not be quickly returned from the independent driving mode to the cooperative driving mode. In this regard, depending on product specifications, when the abnormality is resolved before the abnormality is confirmed, in some cases, it is needed to promptly return the driving mode from the independent driving mode to the cooperative driving mode. Therefore, in the present embodiment, the reaction force control device 40 and the turning control device 50 have the following configurations.

There is a master-slave relationship between the first system circuit 41 and the second system circuit 42 of the reaction force control device 40. The first system circuit 41 is a master, and the second system circuit 42 is a slave. There is a master-slave relationship between the first system circuit 51 and the second system circuit 52 of the turning control device 50. The first system circuit 51 is a master, and the second system circuit 52 is a slave.

As shown in FIG. 5A, the first reaction force control circuit 41A has a controller 61, a multiplier 62, a limit processor 63, a multiplier 64, a feedback controller 65, and a multiplier 66.

The controller 61 calculates a current command value $I_{M\_in}*$ based on the steering torque Th. The multiplier 62 calculates a current command value $I_{m1}*$ by multiplying the current command value $I_{M\_in}*$ by an output gain $G_{AM1}$. The limit processor 63 calculates a current command value $I_{M2}*$ by executing a limiting process to limit the current command value $I_{M1}*$ to a value within a predetermined allowable range. The multiplier 64 calculates a final current command value $I_{M\_out}*$ for the winding group N11 of the reaction motor 21 by multiplying the current command value $I_{M2}*$ after the limiting process by a gain $G_{EM}$. The feedback controller 65 generates a drive signal for the motor drive circuit 41B to eliminate the difference between the final current command value $I_{M\_out}*$ and the value of the current supplied to the winding group N11 of the reaction motor 21. The multiplier 66 calculates a current command value $I_{M3}*$ by multiplying the current command value $I_{M\_in}*$ by an output gain $G_{AM2}$.

The second reaction force control circuit 42A includes a controller 71, a multiplier 72, a multiplier 73, a multiplier 74, adder 75, a selection processor 76, a limit processor 77, a multiplier 78, and a feedback controller 79.

The controller 71 calculates a current command value $I_{S\_in}*$ based on the steering torque Th. The multiplier 72 calculates a current command value $I_{S1}*$ by multiplying the current command value $I_{S\_in}*$ by an output gain G A s. The multiplier 73 calculates the current command value $I_{S2}*$ by multiplying the current command value $I_{S1}$ calculated by the multiplier 72 by a distribution gain $G_S$. The multiplier 74 calculates a current command value $I_{M4}*$ by multiplying the current command value $I_{M3}*$ calculated by the multiplier 66 of the first reaction force control circuit 41A by a distribution gain G M. The adder 75 calculates a current command value $I_{S3}*$ by adding the current command value $I_{S2}*$ calculated by the multiplier 73 and the current command value $I_{M4}*$ calculated by the multiplier 74.

The selection processor 76 selects one of the current command value $I_{S1}*$ calculated by the multiplier 72 and the current command values $I_{S3}*$ calculated by the adder 75 as a current command value $I_{S4}*$ to be used, depending on the driving mode of the reaction motor 21 decided by the controller 71. When the driving mode is the cooperative driving mode, the selection processor 76 selects the current command value $I_{S3}*$ calculated by the adder 75 as the current command value $I_{S4}*$ to be used. When the driving mode is the independent driving mode and when the driving mode is in the process of returning from the independent driving mode to the cooperative driving mode, the selection processor 76 selects the current command value $I_{S1}*$ calculated by the multiplier 72 as the current command value $I_{S4}*$ to be used.

The limit processor 77 calculates a current command value $I_{S5}*$ by limiting the current command value $I_{S4}*$ selected by the selection processor 76 to a value within a predetermined allowable range. A multiplier 78 calculates a final current command value $I_{S\_out}*$ for the winding group N12 of the reaction motor 21 by multiplying the current command value $I_{S5}*$ after the limiting process by a gain $G_{ES}$. The feedback controller 79 generates a drive signal for the motor drive circuit 42B to eliminate the difference between the final current command value $I_{S\_out}*$ and the value of the current supplied to the winding group N12 of the reaction motor 21.

As indicated by a thick arrow in FIG. 5A, when the driving mode is the independent driving mode, the selection processor 76 of the second reaction force control circuit 42A selects a current command value $I_{S1}*$ calculated by the multiplier 72 as the current command value $I_{S4}*$ to be used. That is, the second reaction force control circuit 42A calculates the final current command value $I_{S\_out}*$ without using the current command value $I_{M\_in}*$ calculated by the controller 61 of the first reaction force control circuit 41A. The master-slave relationship between the first reaction force control circuit 41A and the second reaction force control circuit 42A is in a temporarily dissolved state.

As indicated by a thick arrow in FIG. 5B, when the driving mode is the independent driving mode, the selection processor 76 selects the current command value $I_{S3}*$ calculated by the adder 75 as the current command value $I_{S4}*$ to be used when the return determination condition is established. Note that, the second reaction force control circuit 42A gradually decreases the use rate of the current command value $I_{S\_in}*$ calculated by the controller 71, and gradually increases the use rate of the current command value $I_{M\_in}*$ calculated by the controller 61. Specifically, the second reaction force control circuit 42A gradually decreases the ratio of the current command value $I_{S2}*$ to the current command value $I_{S3}*$, and gradually increases the ratio of the current command value M4* to the current command value $I_{S3}*$. Finally, the second reaction force control circuit 42A calculates the final current command value $I_{S\_out}*$ by using 100% of the current command value $I_{M4}*$ based on the current command value $I_{M\_in}*$ calculated by the controller 61 of the first reaction force control circuit 41A. In the present embodiment, the return determination condition for making transition of the driving mode from the independent driving mode to the cooperative driving mode does not include items related to the travelling state or steering state of the vehicle.

Incidentally, the multipliers 62, 66, 72 can change the values of the respective output gains $G_{AM1}$, $G_{AM2}$, $G_{AS}$. The values of the output gains $G_{AM1}$, $G_{AM2}$, and $G_{AS}$ can be set, for example, in the range of "0" to "2" in steps of "0.1". By adjusting the values of the output gains $G_{AM1}$, $G_{AM2}$, the current command value $I_{M\_in}*$ calculated by the controller 61 can be adjusted. By adjusting the value of the output gain $G_{AS}$, the current command value $I_{S\_in}*$ calculated by the controller 71 can be adjusted.

Further, the multipliers 73, 74 can change the values of the distribution gains $G_S$, $G_M$, respectively. The values of the distribution gains $G_S$, $G_M$ can be set, for example, in the range of "0" to "1" in steps of "0.1". The values of the distribution gains $G_S$, $G_M$ are set such that the sum thereof is "1". The values of the distribution gains $G_S$, $G_M$ are values indicating the distribution ratio between the current command value $I_{M\_in}*$ calculated by the controller 61 and the current command value $I_{S\_in}*$ calculated by the controller 71. By adjusting the values of the distribution gains $G_S$, $G_M$, the distribution ratio between the current command value $I_{M\_in}*$ calculated by the controller 61 and the current command value $I_{S\_in}*$ calculated by the controller 71 can be adjusted. The distribution ratio is for the current command value $I_{S3}*$ calculated by the adder 75.

The first turning control circuit 51A basically has the same configuration as the first reaction force control circuit 41A shown in FIGS. 5A and 5B. The second turning control circuit 52A basically has the same configuration as the second reaction force control circuit 42A shown in FIGS. 5A and 5B. Therefore, a detailed description of the configurations of the first turning control circuit 51A and the second turning control circuit 52A is omitted. Note that, the first reaction force control circuit 41A is read as the first turning control circuit 51A, and the second reaction force control circuit 42A is read as the second turning control circuit 52A. Further, the winding group N11 of the first system is read as the winding group N21, and the winding group N12 of the second system is read as the winding group N22. Further, the motor drive circuit 41B is read as the motor drive circuit 51B, and the motor drive circuit 42B is read as the motor drive circuit 52B.

First Pattern of State Transition

Next, a first pattern of state transition of each control circuit according to the present embodiment will be described. Here, as an abnormality in which the driving mode is switched to the independent driving mode, a case where a communication abnormality occurs between the first reaction force control circuit 41A and the first turning control circuit 51A is taken as an example. Note that, communication between the first reaction force control circuit 41A and the second reaction force control circuit 42A is normal. Communication between the first turning control circuit 51A and the second turning control circuit 52A is also normal.

As shown in a time chart of FIG. 6, in a case where each of the control circuits 41A, 42A, 51A, 52A controls the driving of the motors 21, 31 in the cooperative driving mode, when a communication abnormality occurs between the first reaction force control circuit 41A and the first turning control circuit 51A (time T21), each driving mode is switched as follows. That is, the first reaction force control circuit 41A and the first turning control circuit 51A switch respective driving modes from the cooperative driving mode to the independent driving mode. Further, the first reaction force control circuit 41A and the first turning control circuit 51A switch gains for the current command values evaluated through respective calculations from "1 time" in the normal control to "0 times".

Note that, gains of the first reaction force control circuit 41A and the first turning control circuit 51A correspond to the output gain $G_{AM1}$ shown in FIGS. 5A and 5B. Gains of the second reaction force control circuit 42A and the second turning control circuit 52A correspond to the output gain $G_{AS}$ shown in FIGS. 5A and 5B. Further, the first current command value corresponds to the current command value $I_{M\_in}*$ calculated by the controller 61 of the first reaction force control circuit 41A. The second current command value corresponds to the current command value $I_{S\_in}*$ calculated by the controller 71 of the second reaction force control circuit 42A. The third current command value corresponds to the current command value $I_{M\_in}*$ calculated by the controller 61 of the first turning control circuit 51A. The fourth current command value corresponds to the current command value $I_{S\_in}*$ calculated by the controller 71 of the second turning control circuit 52A.

By multiplying the first current command value calculated by the first reaction force control circuit 41A by the gain "0 times", a final first current command value becomes "0". Further, by multiplying the third current command value calculated by the first turning control circuit 51A by the gain "0 times", a final third current command value also becomes "0". That is, electric power supply to the winding group N11 of the first system of the reaction motor 21 and the winding group N21 of the first system of the turning motor 31 is stopped. Therefore, the winding groups N11, N21 of the first system do not generate torque.

The second reaction force control circuit 42A recognizes through the first reaction force control circuit 41A that a communication abnormality occurs in the first system. The second turning control circuit 52A recognizes through the first turning control circuit 51A that a communication abnormality occurs in the first system.

The second reaction force control circuit 42A and the second turning control circuit 52A switch respective driving modes from the cooperative driving mode to the independent driving mode, when the second reaction force control circuit 42A and the second turning control circuit 52A recognize that the communication abnormality in the first system occurs. Further, the second reaction force control circuit 42A and the second turning control circuit 52A switch gains for the current command values evaluated through respective calculations from "1 time" in the normal control to "2 times".

By multiplying the second current command value calculated by the second reaction force control circuit 42A by the gain "2 times", a final second current command value becomes a value twice the normal value. Further, by multiplying the fourth current command value calculated by the second turning control circuit 52A by the gain "2 times", a final fourth current command value also becomes twice the normal value. That is, it is possible to supply twice as much electric power as normal to the winding group N12 of the second system of the reaction motor 21 and the winding group N22 of the second system of the turning motor 31. Therefore, the winding groups N12, N22 of the second system can generate twice as much torque as normal. Therefore, it is possible to compensate for the decrease in the torque generated by the winding groups N11, N21 of the first system with the torque generated by the winding groups N12, N22 of the second system. Note that, depending on the product specifications, the second current command value and the fourth current command value may be limited to a limit value that is set based on a limit value of a predetermined allowable range when the second current command value and the fourth current command value exceed the allowable range.

Here, when driving of the motors 21, 31 is controlled in the independent driving mode by the second system, it is considered that a communication abnormality in the first system is resolved before the communication abnormality in the first system is confirmed.

The first reaction force control circuit 41A and the first turning control circuit 51A of the abnormal system return the driving mode from the independent driving mode to the cooperative driving mode when the abnormality is resolved before the abnormality is confirmed, that is, when the predetermined return determination condition is established (time T22).

Note that, unlike the first and second comparative examples, the return determination condition does not include items related to the travelling state or steering state of the vehicle. Therefore, the first reaction force control circuit 41A and the first turning control circuit 51A make transition of the driving mode from the independent driving mode to the cooperative driving mode, irrespective of the travelling state or steering state of the vehicle, when the return determination condition is established before the abnormality is confirmed.

The first reaction force control circuit 41A and the first turning control circuit 51A of the abnormal system gradually change gain values for current command values evaluated through respective calculations from "0 times" at the time of the abnormality toward "1 time" in the normal control over time irrespective of the travelling state or steering state of the vehicle, when the return determination condition is established before the abnormality is confirmed. When the gain values reach "1" (time T23), the return to the cooperative driving mode is completed. The gain values are maintained at "1" while the cooperative driving mode is selected for the driving mode.

Accordingly, the second reaction force control circuit 42A and the second turning control circuit 52A of the normal system also make transition of the driving mode from the independent driving mode to the cooperative driving mode regardless of the travelling state or steering state of the vehicle. In addition, the second reaction force control circuit 42A and the second turning control circuit 52A gradually change the gains for the current command values evaluated through respective calculations from "2 times" at the time of the abnormality toward "1 time" in the normal control over time regardless of the travelling state or steering state of the vehicle. When the gain values reach "1" (time T23), the return to the cooperative driving mode is completed. The gain values are maintained at "1" while the cooperative driving mode is selected for the driving mode.

Change in Total Current Command Value

Next, when the driving mode is returned from the independent driving mode to the cooperative driving mode, a change in a current command value as a total of the two systems will be described. Here, like the example described above, as an abnormality in which the driving mode is switched to the independent driving mode, a case where a communication abnormality occurs between the first reaction force control circuit 41A and the first turning control circuit 51A is taken as an example. A current command value corresponding to the maximum output of the reaction motor 21 and the turning motor 31, that is, the maximum torque that the reaction motor 21 and the turning motor 31 can generate is assumed to be "100". There is a master-slave relationship between the first reaction force control circuit 41A and the second reaction force control circuit 42A. The first reaction force control circuit 41A is a master, and the second reaction force control circuit 42A is a slave. Further, there is a master-slave relationship between the first turning control circuit 51A and the second turning control circuit 52A. The first turning control circuit 51A is a master, and the second turning control circuit 52A is a slave.

Figure 7:
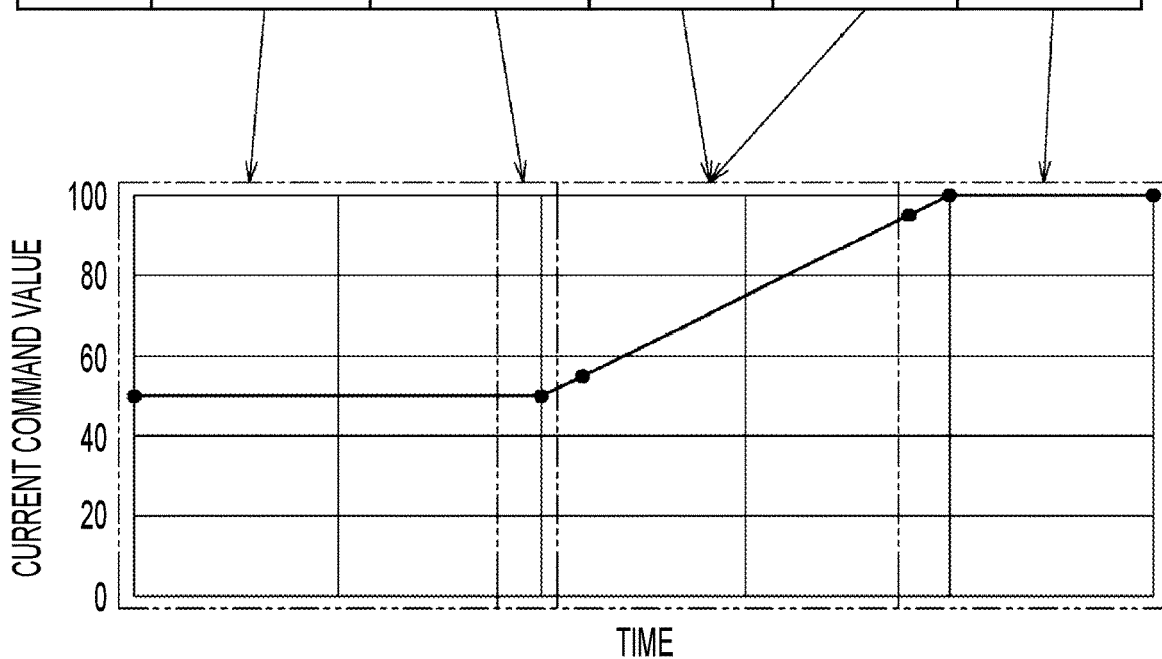
FIG. 7 are a list diagram showing changes in a gain, a limit value, and a current command value during a period until the driving mode is returned from the independent driving mode to the cooperative driving mode, and a graph showing temporal changes in the current command value during the period until the driving mode is returned from the independent driving mode to the cooperative driving mode.

As shown in FIG. 7, the current command value $I_{M\_in}{}^*$ calculated by the controller 61 of the first reaction force control circuit 41A is maintained at "100" during a period until the driving mode is completely returned from the independent driving mode to the cooperative driving mode. The limit value used by the limit processor 63 is maintained at "100" during the period until the driving mode is completely returned from the independent driving mode to the cooperative driving mode. The gain $G_{EM}$ is maintained at "0.5".

As shown in FIG. 7, the current command value $I_{S\_in}{}^*$ calculated by the controller 71 of the second reaction force control circuit 42A is maintained at "100" during the period until the driving mode is completely returned from the independent driving mode to the cooperative driving mode. The limit value used by the limit processor 77 is maintained at "100" during the period until the driving mode is completely returned from the independent driving mode to the cooperative driving mode. The gain GEs is maintained at "0.5".

When the independent driving mode is selected for the driving mode, the output gain $G_{AM1}$ is "0" and the output gain $G_{AM2}$ is "2". Therefore, the final current command value $I_{M\_out}{}^*$ for the winding group N11 of the reaction motor 21 becomes "0". When the independent driving mode is selected for the driving mode, the output gain $G_{AS}$ is "2", the distribution gain $G_M$ is "0", and the distribution gain $G_S$ is "1". Therefore, the final current command value $I_{S\_out}{}^*$ for the winding group N12 of the reaction motor 21 becomes "50". That is, by multiplying the current command value $I_{S\_in}{}^*$ "100" by the output gain $G_{AS}$ "2", the current command value $I_{S1}{}^*$ becomes "200". The current command value $I_{S1}{}^*$ is limited to "100" by the limiting process executed by the limit processor 77. By multiplying the limited current command value $I_{S5}{}^*$ by the gain $G_{EM}$ "0.5", the final current command value $I_{S\_out}{}^*$ becomes "50". Therefore, as shown in FIG. 7, the total current command value for the reaction motor 21 is "50".

When the independent driving mode is selected for the driving mode, triggered by the establishment of the return determination condition, the final current command value $I_{M\_out}{}^*$ for the winding group N11 of the reaction motor 21 is gradually increased toward "50" which is the value in the normal control. Specifically, when the independent driving mode is selected for the driving mode, triggered by the establishment of the return determination condition, the value of the output gain $G_{AM1}$ is increased from "0" toward "1" in steps of "0.1", while the value of the output gain $G_{AM2}$ is decreased from "2" toward "1" in steps of "0.1". Therefore, the final current command value $I_{M\_out}{}^*$ is increased in steps of "5".

For example, when the distribution ratio of the current command value $I_{M\_in}{}^*$ of the first reaction force control circuit 41A serving as a master M to the current command value $I_{S\_in}{}^*$ of the second reaction force control circuit 42A serving as a slave S in the total current command value for the reaction motor 21 is "1:9", the value of the output gain $G_{AM1}$ is "0.1", and the value of the output gain $G_{AM2}$ is "1.9". In this case, the final current command value $I_{M\_out}*$ for the winding group N11 of the reaction motor 21 becomes "5". The value of the output gain $G_{AS}$ is "1.9", the value of the distribution gain $G_M$ is "0.1", and the value of the distribution gain $G_S$ is "0.9". In this case, the final current command value $I_{S\_out}*$ for the winding group N12 of the reaction motor 21 becomes "50". Therefore, as shown in FIG. 7, the total current command value for the reaction motor 21 becomes "55".

When the distribution ratio of the first reaction force control circuit 41A to the second reaction force control circuit 42A in the total current command value for the reaction motor 21 is "9:1", the value of the output gain $G_{AM1}$ is "0.9", and the value of the output gain $G_{AM2}$ is "1.1". In this case, the final current command value $I_{M\_out}*$ for the winding group N11 of the reaction motor 21 becomes "45". The value of the output gain $G_{AS}$ is "1.1", the value of the distribution gain $G_M$ is "0.9", and the value of the distribution gain GS is "0.1". In this case, the final current command value $I_{S\_out}*$ for the winding group N12 of the reaction motor 21 becomes "50". Therefore, as shown in FIG. 7, the total current command value for the reaction motor 21 becomes "95".

When the driving mode is completely returned to the cooperative driving mode, the value of the output gain $G_{AM1}$ is "1", and the value of the output gain $G_{AM2}$ is "1". In this case, the final current command value $I_{M\_out}*$ for the winding group N11 of the reaction motor 21 becomes "50". The value of the output gain $G_{AS}$ is "1", the value of the distribution gain $G_M$ is "1", and the value of the distribution gain $G_S$ is "0". In this case, the final current command value $I_{S\_out}*$ for the winding group N12 of the reaction motor 21 becomes "50". Therefore, as shown in FIG. 7, the total current command value for the reaction motor 21 becomes "100".

Figure 8A:
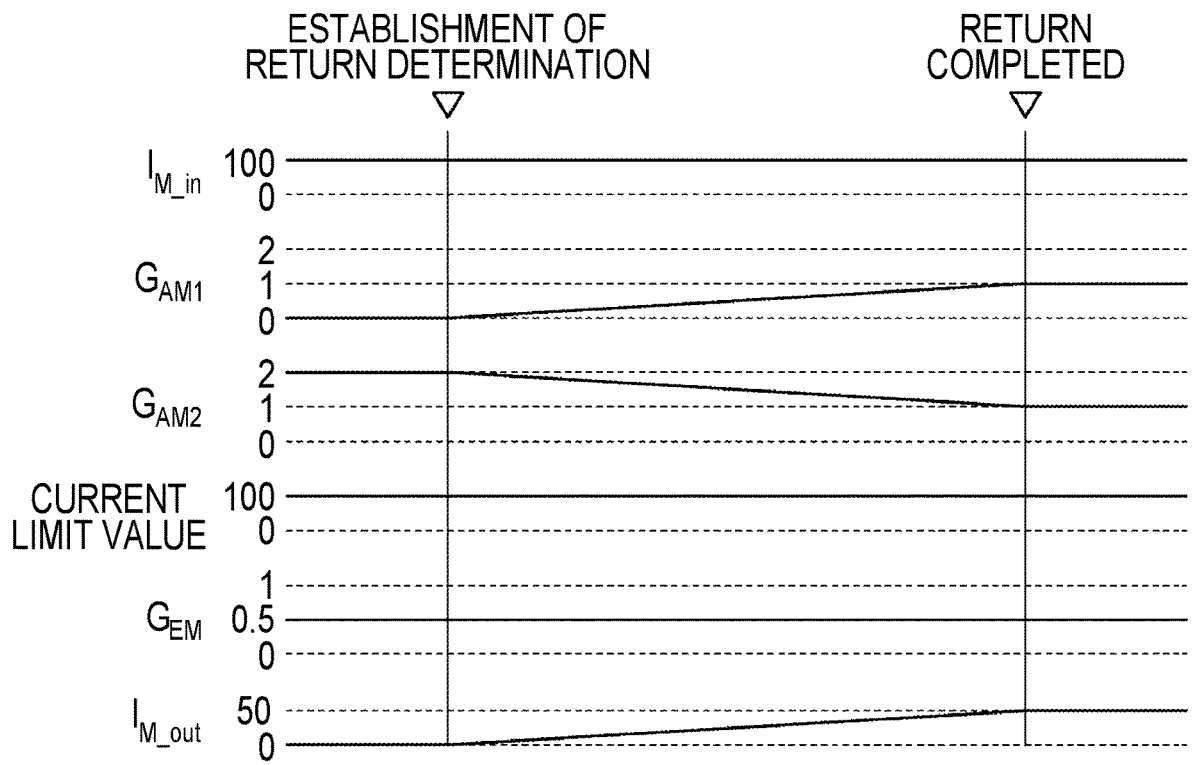
FIG. 8A is a graph showing temporal changes in a gain, a limit value, and a current command value when a driving mode of a first reaction force control circuit or a first turning control circuit returns from an independent driving mode to a cooperative driving mode.

As shown in a graph of FIG. 8A, triggered by the establishment of the return determination condition, the value of the output gain $G_{AM1}$ is gradually increased from "0" toward "1", while the value of the output gain $G_{AM2}$ is gradually decreased from "2" toward "1". In this way, the final current command value $I_{M\_out}*$ for the winding group N11 of the reaction motor 21 is gradually increased from "0" toward "50". When the driving mode is returned from the independent driving mode to the cooperative driving mode, the final current command value $I_{M\_out}*$ for the winding group N11 of the reaction motor 21 does not change rapidly.

Figure 8B:
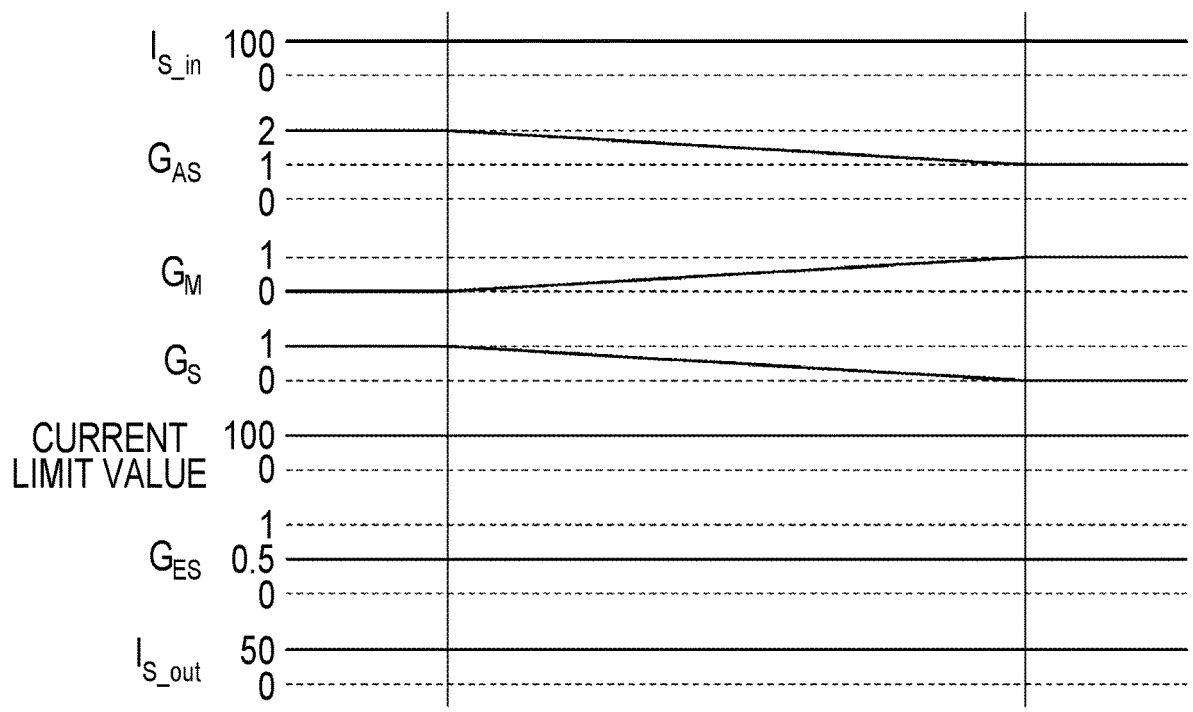
FIG. 8B is a graph showing temporal changes in a current command value when a driving mode of a second reaction force control circuit or a second turning control circuit is returned from an independent driving mode to a cooperative driving mode.

As shown in a graph of FIG. 8B, triggered by the establishment of the return determination condition, the value of the output gain G As is gradually decreased from "2" toward "1". Further, triggered by the establishment of the return determination condition, the value of the distribution gain $G_M$ is gradually increased from "0" toward "1". Further, triggered by the establishment of the return determination condition, the value of the distribution gain GS is gradually decreased from "1" toward "0". In this way, the distribution ratio of the current command value $I_{M\_in}*$ calculated by the controller 61 is gradually increased, while the distribution ratio of the current command value $I_{S\_in}*$ calculated by the controller 71 is gradually decreased. Therefore, when the driving mode is returned from the independent driving mode to the cooperative driving mode, the value of the final current command value $I_{S\_out}*$ for the winding group N12 of the reaction motor 21 does not change rapidly even when the current command value $I_{M\_in}*$ and the current command value $I_{S\_in}*$ are different values.

The first turning control circuit 51A basically operates in the same manner as the first reaction force control circuit 41A. The second turning control circuit 52A basically operates in the same manner as the second reaction force control circuit 42A.

Second Pattern of State Transition

Next, a second pattern of state transition of each control circuit according to the present embodiment will be described. Here, as an abnormality in which the driving mode is switched to the independent driving mode, a case where a communication abnormality occurs between the first reaction force control circuit 41A and the second reaction force control circuit 42A is taken as an example. Note that, communication between the first reaction force control circuit 41A and the first turning control circuit 51A is normal. Communication between the first turning control circuit 51A and the second turning control circuit 52A is also normal.

As shown in a time chart of FIG. 9, in a case where each of the control circuits 41A, 42A, 51A, 52A controls the driving of the motors 21, 31 in the cooperative driving mode, when a communication abnormality occurs between the first reaction force control circuit 41A and the second reaction force control circuit 42A (time T31), each driving mode is switched as follows. That is, the first reaction force control circuit 41A and the second reaction force control circuit 42A switch respective driving modes from the cooperative driving mode to the independent driving mode.

Note that, the first reaction force control circuit 41A and the second reaction force control circuit 42A maintain gains (=output gains $G_{AM1}$, $G_{AM2}$, $G_{AS}$) for the current command values evaluated through respective calculations at "1 time" in the normal control. Therefore, the same electric power as that in the normal control is supplied to the winding groups N11, N12 of two systems of the reaction motor 21. Therefore, the winding groups N11, N12 generate the same torque as that in the normal control.

The first turning control circuit 51A recognizes a communication abnormality between the first reaction force control circuit 41A and the second reaction force control circuit 42A through the first reaction force control circuit 41A. The second turning control circuit 52A recognizes the communication abnormality between the first reaction force control circuit 41A and the second reaction force control circuit 42A through the first turning control circuit 51A. Note that, in this case, the first turning control circuit 51A and the second turning control circuit 52A maintain the respective driving modes in the cooperative driving mode. Further, the first turning control circuit 51A and the second turning control circuit 52A maintain gains (=output gains $G_{AM1}$, $G_{AM2}$, $G_{AS}$) for the current command values evaluated through respective calculations at "1 time" in the normal control. That is, the same electric power as that in the normal control is supplied to the winding groups N21, N22 of the two systems of the turning motor 31. Therefore, the winding groups N21, N22 generate the same torque as that in the normal control.

When the driving mode is switched from the cooperative driving mode to the independent driving mode, the second reaction force control circuit 42A changes values of gains (=distribution gains $G_M$, $G_S$) as in the first pattern shown in FIG. 7 above. The second reaction force control circuit 42A switches the value of the distribution gain $G_M$ for the current command value $I_{M\_in}*$ calculated by the controller 61 from "1" to "0". Further, the second reaction force control circuit 42A switches the value of the distribution gain $G_S$ for the current command value $I_{S\_in}*$ calculated by the controller 71 from "0" to "1". The second turning control circuit 52A operates in the same manner as the second reaction force control circuit 42A.

When the abnormality is resolved before the abnormality is confirmed, that is, when the predetermined return determination condition is established (time T32), the first reaction force control circuit 41A and the second reaction force control circuit 42A start returning the driving mode from the independent driving mode to the cooperative driving mode regardless of the travelling state or steering state of the vehicle. Further, the second reaction force control circuit 42A and the second turning control circuit 52A gradually change gains (=distribution gains $G_M$, $G_S$) toward their normal values as in the first pattern shown in the graph of FIG. 8B above. That is, the value of the distribution gain $G_M$ is gradually increased from "0" to "1", while the value of the distribution gain GS is gradually decreased from "1" to "0". The same applies to the first turning control circuit 51A and the second turning control circuit 52A. In due course, the return to the cooperative driving mode is completed (time T33).

Third Pattern of State Transition

Next, a third pattern of state transition of each control circuit according to the preset embodiment will be described. Here, as an abnormality in which the driving mode is switched to the single-system driving mode, a case where a communication abnormality between the first reaction force control circuit 41A and the first turning control circuit 51A is confirmed is taken as an example. Note that, communication between the first reaction force control circuit 41A and the second reaction force control circuit 42A is normal. Communication between the first turning control circuit 51A and the second turning control circuit 52A is also normal.

As shown in a time chart of FIG. 10, in a case where each of the control circuits 41A, 42A, 51A, 52A controls the driving of the motors 21, 31 in the cooperative driving mode, when an abnormality in the first system is confirmed (time T41), each control circuit switches the driving mode as follows. That is, the first reaction force control circuit 41A and the first turning control circuit 51A stop respective operations. The driving mode is a non-assist mode in which torque is not generated by the winding group N11 of the reaction motor 21 and the winding group N21 of the turning motor 31. Further, the first reaction force control circuit 41A and the first turning control circuit 51A maintain values of gains (=output gains $G_{AM1}$, $G_{AM2}$, $G_{AS}$) for the current command values evaluated through respective calculations at "1 time" in the normal control.

The second reaction force control circuit 42A recognizes through the first reaction force control circuit 41A that an abnormality in the first system is confirmed. The second turning control circuit 52A recognizes through the first turning control circuit 51A that the abnormality in the first system is confirmed.

The second reaction force control circuit 42A and the second turning control circuit 52A switch respective driving modes from the cooperative driving mode to the single-system driving mode, when the second reaction force control circuit 42A and the second turning control circuit 52A recognize that the abnormality in the first system is confirmed. Further, the second reaction force control circuit 42A and the second turning control circuit 52A maintain a value of the gain (=output gain $G_{AS}$) for the current command values evaluated through respective calculations at "1 time" in the normal control.

Therefore, the same electric power as that in the normal control is supplied to the winding group N12 of the second system of the reaction motor 21. Therefore, the winding group N12 of the second system generates the same torque as that in the normal control. Further, the same electric power as that in the normal control is supplied to the winding group N22 of the second system of the turning motor 31. Therefore, the winding group N22 of the second system generates the same torque as that in the normal control.

When the driving mode is switched from the cooperative driving mode to the single-system driving mode, the second reaction force control circuit 42A changes values of gains (=distribution gains $G_M$, $G_S$) as in the first pattern shown in FIG. 7 above. The second reaction force control circuit 42A switches the value of the distribution gain $G_M$ for the current command value $I_{M\_in}*$ calculated by the controller 61 from "1" to "0". Further, the second reaction force control circuit 42A switches the value of the distribution gain $G_S$ for the current command value $I_{S\_in}*$ calculated by the controller 71 from "0" to "1". The second turning control circuit 52A operates in the same manner as the second reaction force control circuit 42A.

When the return determination condition is established by the resolution of the abnormality (time T42), the first reaction force control circuit 41A and the first turning control circuit 51A of the abnormal system start returning to the cooperative driving mode regardless of the travelling state or the steering state of the vehicle. Further, the second reaction force control circuit 42A and the second turning control circuit 52A gradually change gains (=distribution gains $G_M$, $G_S$) toward their normal values as in the first pattern shown in the graph of FIG. 8B above. That is, the value of the distribution gain $G_M$ is gradually increased from "0" to "1", while the value of the distribution gain Gs is gradually decreased from "1" to "0". The same applies to the first turning control circuit 51A and the second turning control circuit 52A. In due course, the return to the cooperative driving mode is completed (time T43).

When the return determination condition is established by the resolution of the abnormality in the first system, the second reaction force control circuit 42A and the second turning control circuit 52A of the second system, which is the normal system returns the driving mode from the single-system driving mode to the cooperative driving mode.

Effects of First Embodiment

Therefore, according to the first embodiment, the following effects can be obtained. (1) When the abnormality leading to the independent driving mode is resolved, returning of the driving mode from the independent driving mode to the cooperative driving mode is immediately started regardless of the travelling state or steering state of the vehicle. Therefore, when the abnormality leading to the independent driving mode is resolved, the driving mode can be quickly returned from the independent driving mode to the cooperative driving mode.

(2) When the driving mode is returned from the independent driving mode to the cooperative driving mode, the value of the gain (=output gain $G_{AM1}$, $G_{AM2}$, $G_{AS}$) of the current command value (=$I_{M\_in}*$) of each system is gradually changed toward the normal value. Therefore, it is possible to suppress rapid changes in the final current command values (=$I_{M\_out}*$, $I_{S\_out}$). Therefore, the occurrence of torque fluctuations in the reaction motor 21 or the turning motor 31 can be suppressed. It is possible to maintain and improve the driver's steering feel.

(3) When the driving mode is returned from the independent driving mode to the cooperative driving mode, the values of the gains (=distribution gain $G_M$, $G_S$) that define the distribution ratio of the current command value (=$I_{M\_in}*$) of the first system and the current command value (=$I_{S\_in}*$) of the second system is gradually changed toward the normal values. Therefore, when the driving mode is returned from the independent driving mode to the cooperative driving mode, rapid changes in the final current command values (=$I_{M\_out}*$, $I_{S\_out}*$) can be suppressed even when the current command value (=$I_{M\_in}*$) of the first system and the current command value (=$I_{S\_in}*$) of the second system are different.

Second Embodiment

Next, a second embodiment in which the control device for a vehicle is embodied in an electric power steering device will be described. In addition, the same symbols are attached to members similar to the members in the first embodiment, and the detailed description is omitted.

The electric power steering device is formed by mechanically connecting the steering wheel 11 and the turning wheel 15 shown in FIG. 1 above to each other. That is, the steering shaft 12, the pinion shaft 33, and the turning shaft 13 function as a power transmission path between the steering wheel 11 and the turning wheel 15. The turning angle θw of the turning wheel 15 is changed by linear motion of the turning shaft 13 as the steering wheel 11 is steered.

The electric power steering device includes an assist motor and an assist control device. The assist motor is provided at the same position as the reaction motor 21 or turning motor 31 shown in FIG. 1 above. The assist motor generates an assist force for assisting the operation of the steering wheel 11. The assist force is torque in the same direction as the steering direction of the steering wheel 11. The assist control device controls driving of the assist motor, which is a control target.

Figure 11:
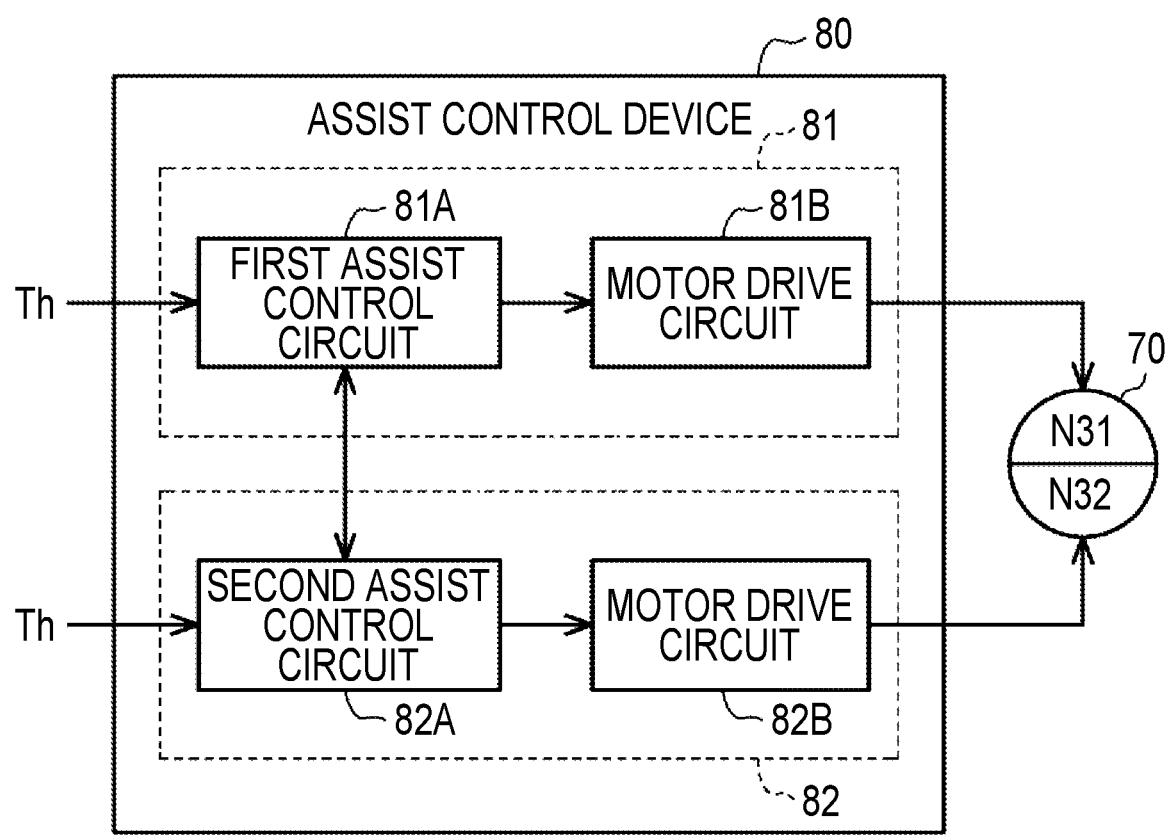
FIG. 11 is a configuration diagram of a control device for a vehicle according to a second embodiment.

As shown in FIG. 11, the assist motor 70 includes a winding group N31 of a first system and a winding group N32 of a second system. The assist control device 80 includes a first system circuit 81. The first system circuit 81 includes a first assist control circuit 81A and a motor drive circuit 81B. The first assist control circuit 81A controls electric power supply to the winding group N31 of the first system. The first assist control circuit 81A generates a drive signal for the motor drive circuit 81B based on the steering torque Th detected through the torque sensor 23.

The motor drive circuit 81B converts the DC power supplied from the DC power supply 60 into three-phase AC power based on the drive signal generated by the first assist control circuit 81A. The three-phase AC power generated by the motor drive circuit 81B is supplied to the winding group N31 of the first system of the assist motor 70 through an electric power supply path for each phase, which is formed of a busbar, a cable, or the like.

The assist control device 80 includes a second system circuit 82. The second system circuit 82 includes a second assist control circuit 82A and a motor drive circuit 82B. The second assist control circuit 82A controls electric power supply to the winding group N32 of the second system. The second assist control circuit 82A generates a drive signal for the motor drive circuit 82B based on the steering torque Th detected through the torque sensor 23.

The motor drive circuit 82B converts the DC power supplied from the DC power supply 60 into three-phase AC power based on the drive signal generated by the second assist control circuit 82A. The three-phase AC power generated by the motor drive circuit 82B is supplied to the winding group N32 of the second system of the assist motor 70 through an electric power supply path for each phase, which is formed of a busbar, a cable, or the like.

The first assist control circuit 81A and the second assist control circuit 82A exchange information with each other through a communication line. The information includes abnormality information for the first assist control circuit 81A, the second assist control circuit 82A, or the motor drive circuits 81B, 82B. The information also includes values of various flags. The first assist control circuit 81A and the second assist control circuit 82A cooperatively control driving of the assist motor 70 based on information exchanged with each other.

The first assist control circuit 81A basically has the same configuration as the first reaction force control circuit 41A or the first turning control circuit 51A shown in FIGS. 5A and 5B. The second assist control circuit 82A basically has the same configuration as the second reaction force control circuit 42A or the second turning control circuit 52A shown in FIGS. 5A and 5B. Like the control circuits 41A, 42A, 51A, 52A in the first embodiment, the first assist control circuit 81A and the second assist control circuit 82A control the driving of the assist motor in one of the cooperative driving mode, the independent driving mode, and a single-system driving mode.

When the communication abnormality between the first assist control circuit 81A and the second assist control circuit 82A occurs as the abnormality in which the driving mode is switched to the independent driving mode, the first assist control circuit 81A and the second assist control circuit 82A operate in the same manner as the first reaction force control circuit 41A and the second reaction force control circuit 42A in the first embodiment shown in FIG. 9.

Figure 10:
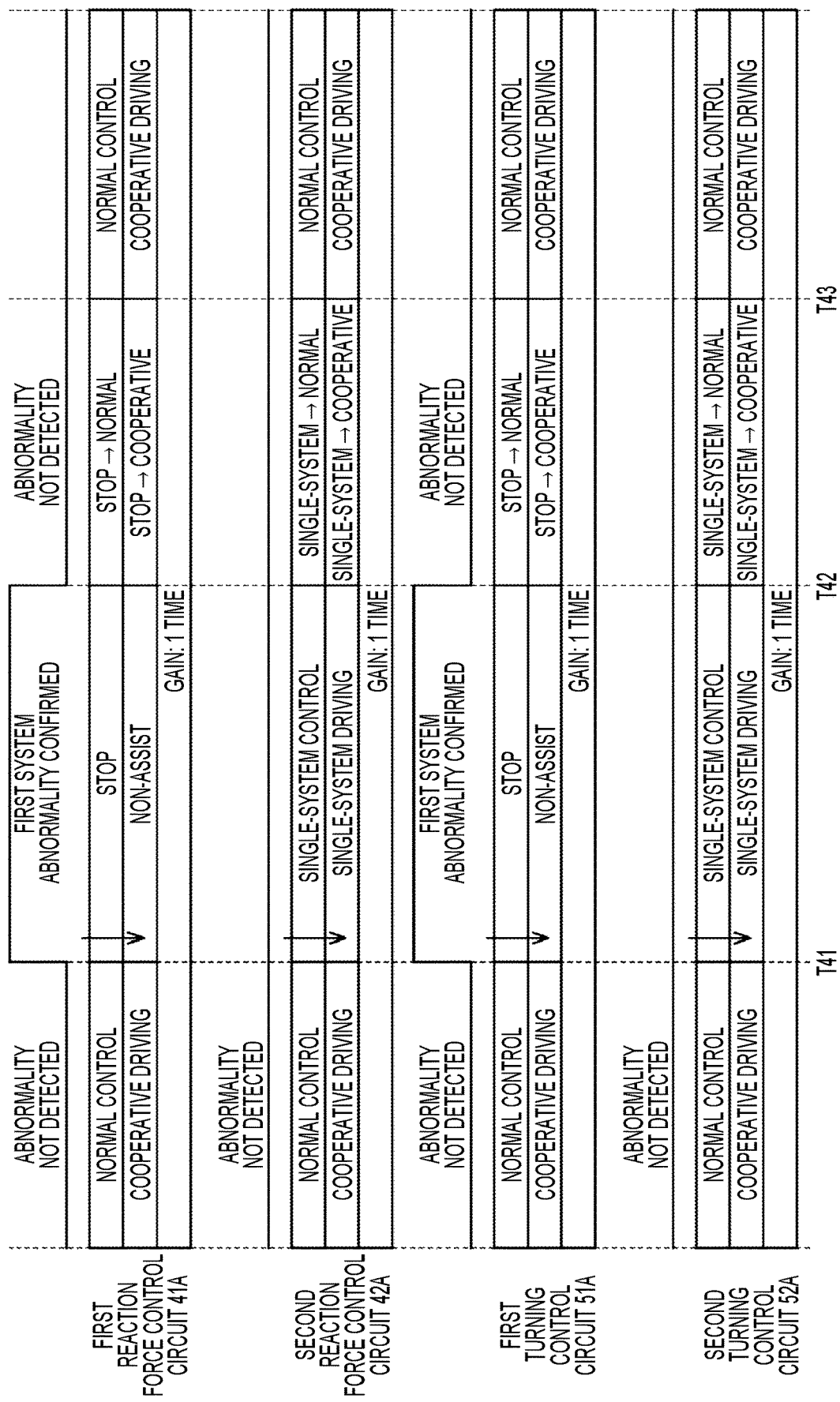
FIG. 10 is a time chart showing a third pattern of state transition of each control circuit in the first embodiment.

When the abnormality in the first system is confirmed as the abnormality in which the driving mode is switched to the single-system driving mode, the first assist control circuit 81A and the second assist control circuit 82A operate in the same manner as the first reaction force control circuit 41A and the second reaction force control circuit 42A in the first embodiment shown in FIG. 10.

Therefore, according to the second embodiment, the same effects as the effects (1) to (3) of the first embodiment can be obtained.

Other Embodiments

The first and second embodiments may be modified as follows.

The limit processors 63, 77 may change their respective limit values according to the driving mode. The limit value is adjustable between a first limit value and a second limit value. The second limit value is set to a value smaller than the first limit value. When the driving mode is the independent driving mode, the limit processors 63, 77 set the first limit value as their respective limit values. When the driving mode is switched from the independent driving mode to the cooperative driving mode, the limit processors 63, 77 set the second limit values as their respective limit values. Note that, the limit processors 63, 77 gradually change the limit value from the first limit value to the second limit value. In this way, it is possible to change the current command value more smoothly while a rapid change in the current command value is suppressed.

In the first embodiment, a steer-by-wire type steering device is used as the control device for a vehicle, and in the second embodiment, the electric power steering device is used as the control device for a vehicle; however, for example, an electric door mirror device that opens and closes in conjunction with the door lock may be used. Any motor control device having a redundant control circuit and motor drive circuit can be used.

What is claimed is:

1. A control device for a vehicle, the control device comprising control circuits of a plurality of systems that calculate a current command value according to torque to be generated by a motor including winding groups of a plurality of systems, and control electric power supply to the winding groups of the systems independently for each system based on the calculated current command value, wherein:
the control circuits of the systems have a master-slave relationship, and have a first driving mode in which electric power supply to the winding groups of the control circuits' own systems is controlled by using a current command value calculated by the control circuit serving as a master, and a second driving mode in which current command values calculated by the control circuits themselves are adjusted and electric power supply to the winding groups of the control circuits' own systems is controlled based on the adjusted current command values; and
when a predetermined transition condition is established, the control circuits of the systems make transition of a driving mode from the first driving mode to the second driving mode, and when a predetermined return condition is established in a state in which the driving mode has transitioned to the second driving mode, the control circuits of the systems make transition of the driving mode from the second driving mode to the first driving mode while gradually changing the current command values of the control circuits' own systems toward the current command value before the adjustment.

2. The control device according to claim 1, wherein:
the control circuit serving as a slave calculates a current command value of the control circuit serving as the slave's own system by multiplying a current command value calculated by the control circuit serving as the slave itself and the current command value calculated by the control circuit serving as the master by distribution gains that are individually set to define a distribution ratio and adding results obtained from the multiplication; and
when the return condition is established in the state in which the driving mode has transitioned to the second driving mode, the control circuit serving as the slave gradually decreases a value of the distribution gain for the current command value calculated by the control circuit serving as the slave itself, and gradually increases a value of the distribution gain for the current command value calculated by the control circuit serving as the master.

3. The control device according to claim 1, wherein:
the control circuits of the systems are able to adjust the control circuits' own current command values by multiplying the current command values calculated by the control circuits themselves by output gains that are individually set;
when transition of the driving mode from the first driving mode to the second driving mode is made, the control circuits of the systems set values of the output gains for the control circuits' own current command values to values smaller than or larger than values in the first driving mode; and
when the return condition is established in the state in which the driving mode has transitioned to the second driving mode, the control circuits of the systems gradually change the values of the output gains for the control circuits' own current command values toward values of the output gains in the first driving mode.

4. The control device according to claim 3, wherein when an abnormality occurs in any one of the systems, the control circuits of the systems make transition of the driving mode from the first driving mode to the second driving mode, set the value of the output gain for the current command value of the control circuit of an abnormal system to a value smaller than that in the first driving mode, and set the value of the output gain for the current command value of the control circuit of a normal system to a value larger than that in the first driving mode.

5. The control device according to claim 1, wherein the control circuits of the systems each include a limit processor that limits the current command value to a value within a predetermined allowable range.

6. The control device according to claim 5, wherein:
the limit processor has a limit value set based on a limit value of the allowable range and is able to adjust the limit value between a first limit value and a second limit value that is a value smaller than the first limit value;
the limit processor sets the second limit value as the limit value when the driving mode is the first driving mode and sets the first limit value as the limit value when the driving mode is the second driving mode; and
the limit processor gradually changes the limit value from the first limit value toward the second limit value when the driving mode transitions from the second driving mode to the first driving mode.

7. The control device according to claim 1, wherein:
the motor includes a reaction motor that includes winding groups of two systems and generates a steering reaction force applied to a steering wheel that is separated from turning wheels of the vehicle in power transmission, and a turning motor that includes winding groups of two systems and generates a turning force for turning the turning wheels of the vehicle;
the control circuits include a first reaction force control circuit for controlling electric power supply to a winding group of a first system of the reaction motor, a second reaction force control circuit for controlling electric power supply to a winding group of a second system of the reaction motor, a first turning control circuit for controlling electric power supply to a winding group of a first system of the turning motor, and a second turning control circuit for controlling electric power supply to a winding group of a second system of the turning motor; and
the control circuits make transition of the driving mode from the first driving mode to the second driving mode when an abnormality occurs in communication between the first reaction force control circuit and the first turning control circuit.

8. The control device according to claim 1, wherein:
the motor is an assist motor that generates an assist force for assisting operation of a steering wheel;

the assist motor includes a winding group of a first system and a winding group of a second system;

the control circuits include a first assist control circuit for controlling electric power supply to the winding group of the first system, and a second assist control circuit for controlling electric power supply to the winding group of the second system; and the control circuits make transition of the driving mode from the first driving mode to the second driving mode when an abnormality occurs in communication between the first assist control circuit and the second assist control circuit.

* * * * *